(12) United States Patent
Kelly et al.

(10) Patent No.: US 11,687,544 B2
(45) Date of Patent: Jun. 27, 2023

(54) ADAPTIVE ANALYTICS USER INTERFACES

(71) Applicant: QLIKTECH INTERNATIONAL AB, Lund (SE)

(72) Inventors: Matthew Kelly, Lund (SE); Vesna Brown, Lund (SE); Elif Tutuk, Lund (SE)

(73) Assignee: QLIKTECH INTERNATIONAL AB, Lund (SE)

( * ) Notice: Subject to any disclaimer, the term of this patent is extended or adjusted under 35 U.S.C. 154(b) by 43 days.

(21) Appl. No.: 16/392,291

(22) Filed: Apr. 23, 2019

(65) Prior Publication Data

US 2019/0324968 A1    Oct. 24, 2019

Related U.S. Application Data

(60) Provisional application No. 62/661,350, filed on Apr. 23, 2018.

(51) Int. Cl.
*G06F 16/248* (2019.01)
*G06F 16/28* (2019.01)
(Continued)

(52) U.S. Cl.
CPC ........ *G06F 16/248* (2019.01); *G06F 16/2428* (2019.01); *G06F 16/24564* (2019.01);
(Continued)

(58) Field of Classification Search
CPC .... G06F 16/248; G06F 16/00; G06F 16/2428; G06F 16/26; G06F 16/287
(Continued)

(56) References Cited

U.S. PATENT DOCUMENTS 5,701,400 A * 12/1997 Amado ............... G06N 5/02
706/45
10,445,424 B2 * 10/2019 Medlock ............. G06F 40/274
(Continued)

FOREIGN PATENT DOCUMENTS

EP    3239862    *  1/2017    ............ G06F 17/30
EP    3239862 A1    11/2017

OTHER PUBLICATIONS

European Search Report dated Jul. 5, 2019 by the European Patent Office for EP Application No. 19170672.0, (Applicant—Qlik Tech International AB) (6 pages).
(Continued)

*Primary Examiner* — Hung T Vy
(74) *Attorney, Agent, or Firm* — Ballard Spahr LLP

(57) ABSTRACT

Provided are methods, systems, and apparatuses for enabling an analytics user interface to be adaptive based on, among other things, content of a user-defined query. A computing device may receive the query, which is to be applied to a dataset. The computing device way receive the query via an analytics user interface. Based on the query and using a recommendation engine, a plurality of recommended result elements and associated visualization elements may be determined. Based on the query and a selected recommended result element, a query result may be generated. The query result may contain a portion of records from the dataset, which may associated with the query and the at least one result element.

18 Claims, 14 Drawing Sheets

(51) Int. Cl.
    *G06F 16/242*     (2019.01)
    *G06F 16/9035*     (2019.01)
    *G06N 20/00*     (2019.01)
    *G06F 16/2455*     (2019.01)
    *G06N 5/04*     (2023.01)
    *G06F 18/214*     (2023.01)

(52) U.S. Cl.
    CPC ........ *G06F 16/287* (2019.01); *G06F 16/9035* (2019.01); *G06F 18/214* (2023.01); *G06N 5/04* (2013.01); *G06N 20/00* (2019.01)

(58) Field of Classification Search
    USPC .................................. 707/769, 728; 706/11
    See application file for complete search history.

(56) References Cited

U.S. PATENT DOCUMENTS

| | | | |
|---|---|---|---|
| 10,546,001 B1* | 1/2020 | Nguyen | ................ G06N 20/00 |
| 2006/0047649 A1 | 3/2006 | Liang | |
| 2012/0029910 A1* | 2/2012 | Medlock | ............... G06F 3/0482<br>704/9 |
| 2014/0195515 A1 | 7/2014 | Baker | |
| 2014/0330821 A1* | 11/2014 | Tullis | .................. G06F 16/2428<br>707/728 |
| 2015/0324434 A1* | 11/2015 | Greenwood | ........ G06F 16/9566<br>707/722 |
| 2015/0379429 A1* | 12/2015 | Lee | ........................ G06N 20/00<br>706/11 |
| 2017/0017903 A1* | 1/2017 | Gray | ....................... G06T 11/60 |
| 2018/0052913 A1* | 2/2018 | Gaskill | .................... G06N 5/02 |

OTHER PUBLICATIONS

Belgin, et al., "Towards a Recommender Engine for Personalized Visualizations", Jun. 11, 2015 (Jun. 11, 2015) (14 pages).

Belgin, et al., "VizRec", ACM, vol. 6, No. 4, Nov. 7, 2016 (Nov. 7, 2016) (39 pages).

* cited by examiner

FIG. 4

| Client | Year | Sum (Number * Price) |
|---|---|---|
| Nisse | 1999 | 19.5 |
| Gullan | 1999 | 37.5 |
| Kalle | 1999 | 60 |
| Pekka | <NULL> | 75 |
| <ALL> | 1999 | 117 |
| <ALL> | <NULL> | 75 |
| Nisse | <ALL> | 19.5 |
| Gullan | <ALL> | 37.5 |
| Kalle | <ALL> | 60 |
| Pekka | <ALL> | 75 |
| <ALL> | <ALL> | 192 |

Table 6

**Sum (Number * Price) Per Client, Year**

|  | 1999 | <NULL> | <ALL> |
|---|---|---|---|
| Nisse | 19.5 |  | 19.5 |
| Gullan | 37.5 |  | 37.5 |
| Kalle | 60 |  | 60 |
| Pekka |  | 75 | 75 |
| <ALL> | 117 | 75 | 192 |

Table 7

ADAPTIVE ANALYTICS USER INTERFACES

CROSS REFERENCE TO RELATED APPLICATION

This application claims priority to U.S. Provisional Application No. 62/661,350 filed on Apr. 23, 2018, which is herein incorporated by reference in its entirety.

SUMMARY

It is to be understood that both the following general description and the following detailed description are exemplary and explanatory only and are not restrictive, as claimed. Provided are methods and systems for data management and analysis.

In an aspect, provided is a method for enabling an analytics user interface to be adaptive based on, among other things, content of a user-defined query. A computing device may receive the query, which is to be applied to a dataset. The computing device may receive the query via an analytics user interface. Based on the query and using a recommendation engine, a plurality of recommended result elements and associated visualization elements may be determined. The plurality of recommended result elements and associated visualization elements may be provided via the analytics user interface. The computing device may receive a selection, via the analytics user interface, of at least one recommended result element of the plurality of recommended result elements. Based on the query and the selected recommended result element, a query result may be generated. The query result may contain a portion of records from the dataset, which may associated with the query and the at least one result element. The selected at least one recommended result element may be associated with a visualization element. The associated visualization element may be used to generate a visualization of the query result. The visualization may comprise a chart, a graph, a table, or any other suitable graphical object. The generated visualization may be provided to the analytics user interface.

In another aspect, provided is a method for training a machine learning module. A computing device may receive, via an analytics user interface, a query and a selected result element. The result element may be one of a plurality of result elements provided for selection by a user via the analytics user interface. Based on the query and the selected result element, a query result from a dataset may be determined, and a selection of a visualization element from among a plurality of visualization elements may be received. The visualization element may be applied to the query result. A training dataset may be generated. The training dataset may be based on the query, the selected result element, and the selected visualization element. Using the training dataset, the computing device may train the machine learning module.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 provides tables showing a final data structure created by evaluating mathematical functions;

DETAILED DESCRIPTION

Figure 1:
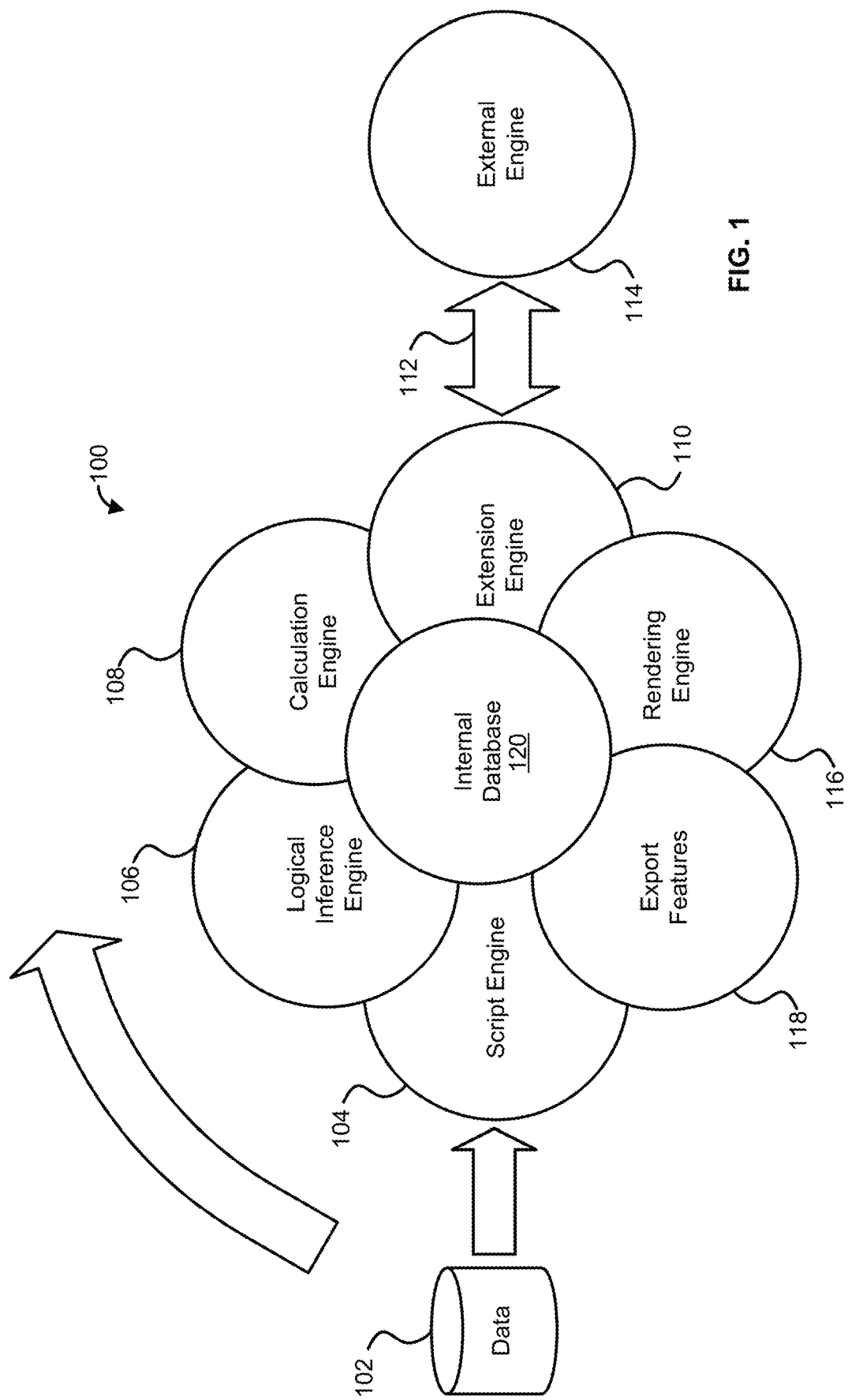
FIG. 1 is a schematic diagram showing an embodiment of a system forming an implementation of the disclosed methods.

Before the present methods and systems are disclosed and described in more detail, it is to be understood that the methods and systems are not limited to specific steps, processes, components, or structure described, or to the order or particular combination of such steps or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers or steps. "Exemplary" means "an example of", but not essential, necessary, or restricted or limited to, nor does it convey an indication of a preferred or ideal embodiment. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that is exemplary.

Steps and components described herein as being used to perform the disclosed methods and construct the disclosed systems are exemplary unless the context clearly dictates otherwise. It is to be understood that when combinations, subsets, interactions, groups, etc. of these steps and components are disclosed, that while specific reference of each various individual and collective combinations and permutation of these may not be explicitly disclosed, each is specifically contemplated and described herein, for all methods and systems. This applies to all aspects of this application including, but not limited to, steps in disclosed methods and/or the components disclosed in the systems. Thus, if there are a variety of additional steps that can be performed or components that can be added, it is understood that each of these additional steps can be performed and components added with any specific embodiment or combination of embodiments of the disclosed systems and methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices, whether internal, networked or cloud based.

Embodiments of the methods and systems are described below with reference to diagrams, flowcharts and other illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to computer implemented methods and systems for data management, data analysis, and processing. The methods and systems described herein may implement an analytics user interface, which may have a visual component that allows users to view and analyze data. The visual component of the analytics user interface may be used to generate dynamic multiple visualizations that represent data and enable the users to explore the visualizations and the data, or portions thereof. The analytics user interface may assist users in managing data, authoring dynamic visualizations to represent the data, or portions thereof, viewing and interacting with a set of visualizations, a combination thereof, and/or the like.

The analytics user interface may be an adaptive user interface with features that enhance its functionality and overall user experience. This may be accomplished using, among other things, machine learning techniques. Traditional machine learning systems provide value by transforming data to be displayed at a user interface. In adaptive user interfaces, this transformed data is used to adapt, or to change, the user interface to improve a user's experience. The adaptive component of the analytics user interface may leverage the intersection of three components of analytics user interfaces to adapt the user's experience: context, personalization, and capability. To provide adaptation in the analytics user interface, the adaptive component may perform the following three functions: dynamic rendering, modeling of a user(s) behavior, and providing guidance. Specific points of adaptation in the analytics user interface may be determined by analyzing common workflows of users (e.g., queries, searches, reports, etc.) across the primary functions of the analytics user interface and the analytics data, or portions thereof, within those contexts.

As an example, with respect to dynamic rendering, data connectors which are installed on a system running the analytics user interface may be rendered before those which require additional installation. Alternatively, the analytics user interface may be dynamically rendered to match the user's experience level. Expert users may have access to a data load script editor of the analytics user interface, whereas novice users may be presented with a guided experience. With respect to modeling a user's behavior, data sources used by users may be compiled into a collaborative filtering machine learning model. When users have begun selecting data sources, the analytics user interface may begin to suggest a next source to select (e.g., based that particular user and/or one or more other users' previous queries, searches, reports, etc.). With respect to providing guidance, when errors are detected in loading data (e.g., an incorrect data source may be selected by a user; an incompatible visualization type may be selected by a user, etc.), the analytics user interface may suggest strategies to remedy the failure.

As another example, with respect to authoring visualizations and dynamic rendering thereof, a visualization, or properties of visualizations which are appropriate for the user's authoring intent (e.g., based on keywords in a query), may be rendered in the top of a list (e.g., a drop-down menu, list box, etc.). With respect to modeling the user's behavior, dimensions of data (e.g., width and height of data portions to be selected from a whole dataset) for which a user is creating visualizations may be collected and compiled into a machine learning model. These dimensions that form an overall layout may be used to suggest layouts to the user in the future. With respect to providing guidance, data which is not visible in any visualization may be suggested to the user to include in their visualizations once the user analysis intent and context is understood by the system.

As a further example, with respect to viewing and interacting with visualizations and dynamic rendering thereof, content of a visualization may be dynamically changed based on one or more of the user's analysis context (e.g., based on keywords in a query), recent analysis (e.g., based on keywords of a previous query or queries), or machine-generated findings from the data. For example, on a bar chart that shows "Sales by Region," the system may display additional dots representing "Budget," because the system knows (e.g., from past use of the system by the user) that the user has been analyzing "Budget" in his recent analysis. As another example, the system may change data point symbols in a scatter plot to a star from a dot for points that are statistically significant based on relevant insights that the system finds in the associated data and user's analysis context. With respect to modeling the user's behavior, selections (e.g., filters, result elements, etc.) that users apply to visualizations may be collected and compiled into a machine learning model that may be used to aid the user in determining what filters to apply next. With respect to providing guidance, once sufficient data is compiled from a user's visualization interactions, the user may receive guidance on which visualization or groups of visualizations may be of interest to view.

FIG. 1 illustrates an associative data indexing engine 100 with data flowing in from the left and operations starting from a script engine 104 and going clockwise (indicated by the clockwise arrow) to export features 118. Data from a data source 102 can be extracted by a script engine 104. The data source 102 can comprise any type of known database, such as relational databases, post-relational databases, object-oriented databases, hierarchical databases, flat files, spread sheet, etc. The Internet may also be regarded as a database in the context of the present disclosure. A visual interface can be used as an alternative or combined with a script engine 104. The script engine 104 can read record by record from the data source 102 and data can be stored or appended to symbol and data tables in an internal database 120. Read data can be referred to as a data set.

In an aspect, the extraction of the data can comprise extracting an initial data set or scope from the data source 102, e.g. by reading the initial data set into the primary memory (e.g. RAM) of the computer. The initial data set can comprise the entire contents of the data source 102 base, or a subset thereof. The internal database 120 can comprise the extracted data and symbol tables. Symbol tables can be created for each field and, in one aspect, can only contain the distinct field values, each of which can be represented by their clear text meaning and a bit filled pointer. The data tables can contain said bit filled pointers.

In the case of a query of the data source 102, a scope can be defined by the tables included in a SELECT statement (or equivalent) and how these are joined. In an aspect, the SELECT statement can be SQL (Structured Query Language) based. For an Internet search, the scope can be an index of found web pages, for example, organized as one or more tables. The scope may be defined with the assistance of machine learning and a recommendation engine, as discussed further below with respect to FIG. 5A. A result of the scope definition can be a dataset.

Once the data has been extracted, a user interface (e.g., an adaptive analytics user interface) can be generated to facilitate dynamic display of the data. By way of example, a particular view of a particular dataset or data subset generated for a user can be referred to as a state space or a session. The methods and systems can dynamically generate one or more visual representations of the data to present in the state space.

A user can make a selection in the data set, causing a logical inference engine 106 to evaluate a number of filters (e.g., a number of recommended result elements) on the dataset. For example, a query on a database that holds data of placed orders, could be requesting results matching an order year of '1999' and a client group be 'Nisse.' The selection may thus be uniquely defined by a list of included fields and, for each field, a list of selected values or, more generally, a condition. Based on the selection, the logical inference engine 106 can generate a data subset that represents a part of the scope. The data subset may thus contain a set of relevant data records from the scope, or a list of references (e.g. indices, pointers, or binary numbers) to these relevant data records. The logical inference engine 106 can process the selection and can determine what other selections are possible based on the current selections. In an aspect, flags can enable the logical inference engine 106 to work out the possible selections. By way of example, two flags can be used: the first flag can represent whether a value is selected or not, the second can represent whether or not a value selection is possible. For every click in an application, states and colors for all field values can be calculated. These can be referred to as state vectors, which can allow for state evaluation propagation between tables.

The logical inference engine 106 can utilize an associative model to connect data. In the associative model, all the fields in the data model have a logical association with every other field in the data model. Queries that compare for equality to a string can retrieve values very fast using a hash index. For instance, referring to the tables of FIG. 2, a query of SELECT*FROM Table 2 WHERE Client='Kalle') could benefit from a hash index created on the Client column. In this example, the hash index would be configured such that the column value will be the key into the hash index and the actual value mapped to that key would just be a pointer to the row data in Table 2. Since a hash index is an associative array, a typical entry can comprise "Kalle=>0x29838", where 0x29838 is a reference to the table row where Kalle is stored in memory. Thus, looking up a value of "Kalle" in a hash index can return a reference to the row in memory which is faster than scanning Table 2 to find all rows with a value of "Kalle" in the Client column. The pointer to the row data enables retrieval of other values in the row.

Thus, the logical inference engine 106 can determine a data subset based on user selections. The logical inference engine 106 automatically maintains associations among every piece of data in the entire data set used in an application. The logical inference engine 106 can store the binary state of every field and of every data table dependent on user selection (e.g., included or excluded). This can be referred to as a state space and can be updated by the logical inference engine 106 every time a selection is made. There is one bit in the state space for every value in the symbol table or row in the data table, as such the state space is smaller than the data itself and faster to query. The inference engine may associate values or binary symbols in the dimension tuples. Dimension tuples are normally needed by a hypercube to produce a result.

The associations thus created by the logical inference engine 106 means that when a user makes a selection, the logical inference engine 106 can resolve (quickly) which values are still valid (e.g., possible values) and which values are excluded. The user can continue to make selections, clear selections, and make new selections, and the logical inference engine 106 will continue to present the correct results from the logical inference of those selections. In contrast to a traditional join model database, the associative model provides an interactive associative experience to the user.

Based on current selections and possible rows in data tables a calculation/chart engine 108 can calculate aggregations in objects forming transient hyper cubes in an application. The calculation/chart engine 108 can further build a virtual temporary table from which aggregations can be made. The calculation/chart engine 108 can perform a calculation (e.g., evaluate an expression in response to a user selection/de-selection) via a multithreaded operation. The state space can be queried to gather all of the combinations of dimensions and values necessary to perform the calculation. In an aspect, the query can be on one thread per object, one process, one worker, combinations thereof, and the like. The expression can be calculated on multiple threads per object. Results of the calculation can be passed to a rendering engine 116 and/or optionally to an extension engine 110.

Optionally, the extension engine 110 can be implemented to communicate data via an interface 112 to an external engine 114. In another aspect, the extension engine 110 can communicate data, metadata, a script, a reference to one or more artificial neural networks (ANNs), one or more commands to be executed, one or more expressions to be evaluated, combinations thereof, and the like to the external engine 114. The interface 114 can comprise, for example, an Application Programming Interface (API). The external engine 114 can comprise one or more data processing applications (e.g., simulation applications, statistical applications, mathematical computation applications, database applications, combinations thereof, and the like). The external engine 114 can be, for example, one or more of MATLAB®, R, Maple®, Mathematica®, combinations thereof, and the like.

In an aspect, the external engine 114 can be local to the associative data indexing engine 100 or the external engine 114 can be remote from the associative data indexing engine 100. The external engine 114 can perform additional calculations and transmit the results to the extension engine 110 via the interface 112. A user can make a selection in the data model of data to be sent to the external engine 114. The logical inference engine 106 and/or the extension engine 110 can generate data to be output to the external engine 114 in a format to which the external engine 114 is accustomed to processing. In an example application, tuples forming a hypercube can comprise two dimensions and one expression, such as (Month, Year, Count (ID)), ID being a record identification of one entry. Then said tuples can be exchanged with the external engine 114 through the interface 112 as a table. If the data comprises birth dates, there can be timestamps of the birth dates and these can be stored as month and year. If a selection in the data model will give a set of month-year values that are to be sent out to an external unit, the logical inference engine 106 and/or the extension engine 110 can ripple that change to the data model associatively and produce the data (e.g., set and/or values) that the external engine 114 needs to work with. The set and/or values can be exchanged through the interface 112 with the external engine 114. The external engine 114 can comprise any method and/or system for performing an operation on the set and/or values. In an aspect, operations on the set and/or values by the external engine 114 can be based on tuples (aggregated or not). In an aspect, operations on the set and/or values by the external engine 114 can comprise a database query based on the tuples. Operations on the set and/or values by the external engine 114 can be any transformation/operation of the data as long as the cardinality of the result is consonant to the sent tuples/hypercube result.

In an aspect, tuples that are transmitted to the external engine 114 through the interface 112 can result in different data being received from the external engine 114 through the interface 112. For example, a tuple consisting of (Month, Year, Count (ID)) should return as 1-to-1, m-to-1 (where aggregations are computed externally) or n-to-n values. If data received are not what were expected, association can be lost. Transformation of data by the external engine 114 can be configured such that cardinality of the results is consonant to the sent tuples and/or hypercube results. The amount of values returned can thus preserve associativity.

Results received by the extension engine 110 from the external engine 114 can be appended to the data model. In an aspect, the data can be appended to the data model without intervention of the script engine 104. Data model enrichment is thus possible "on the fly." A natural work flow is available allowing clicking users to associatively extend the data. The methods and systems disclosed permit incorporation of user implemented functionality into a presently used work flow. Interaction with third party complex computation engines, such as MATLAB® or R, is thus facilitated.

The logical inference engine 106 can couple associated results to the external engine 114 within the context of an already processed data model. The context can comprise a tuple or tuples defined by dimensions and expressions computed by hypercube routines. Association is used for determination of which elements of the present data model are relevant for the computation at hand. Feedback from the external engine 114 can be used for further inference inside the inference engine or to provide feedback to the user.

A rendering engine 116 can produce a desired graphical object (charts, tables, etc.) based on selections/calculations. When a selection is made on a rendered object there can be a repetition of the process of moving through one or more of the logical inference engine 106, the calculation/chart engine 108, the extension engine 110, the external engine 114, and/or the rendering engine 116. The user can explore the scope by making different selections, by clicking on graphical objects to select variables, which causes the graphical object to change. At every time instant during the exploration, there exists a current state space, which is associated with a current selection state that is operated on the scope (which always remains the same).

Different export features or tools 118 can be used to publish, export or deploy any output of the associative data indexing engine 100. Such output can be any form of visual representation, including, but not limited to, textual, graphical, animation, audio, tactile, and the like.

Figure 2:
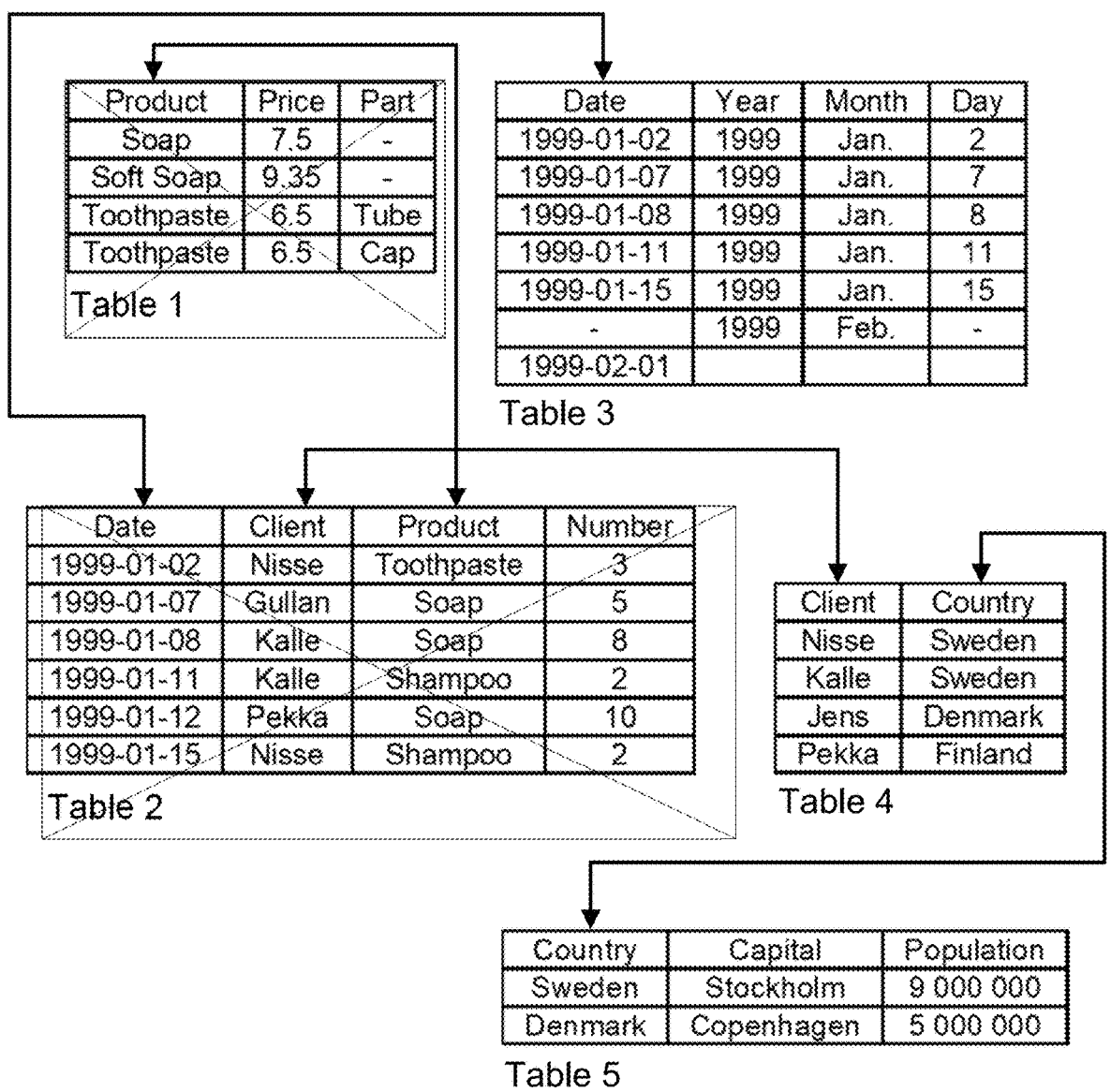
FIG. 2 is a set of tables showing exemplary Tables 1-5 of a simple database and associations between variables in the tables.

An example database, as shown in FIG. 2, can comprise a number of data tables (Tables 1-5). Each data table can contain data values of a number of data variables. For example, in Table 1 each data record contains data values of the data variables "Product," "Price," and "Part." If there is no specific value in a field of the data record, this field is considered to hold a NULL-value. Similarly, in Table 2 each data record contains values of the variables "Date," "Client," "Product," and "Number." In Table 3 each data record contains values of variable "Date" as "Year," "Month" and "Day." In Table 4 each data record contains values of variables "Client" and "Country," and in Table 5 each data record contains values of variables "Country," "Capital," and "Population." Typically, the data values are stored in the form of ASCII-coded strings, but can be stored in any form.

Figure 3:
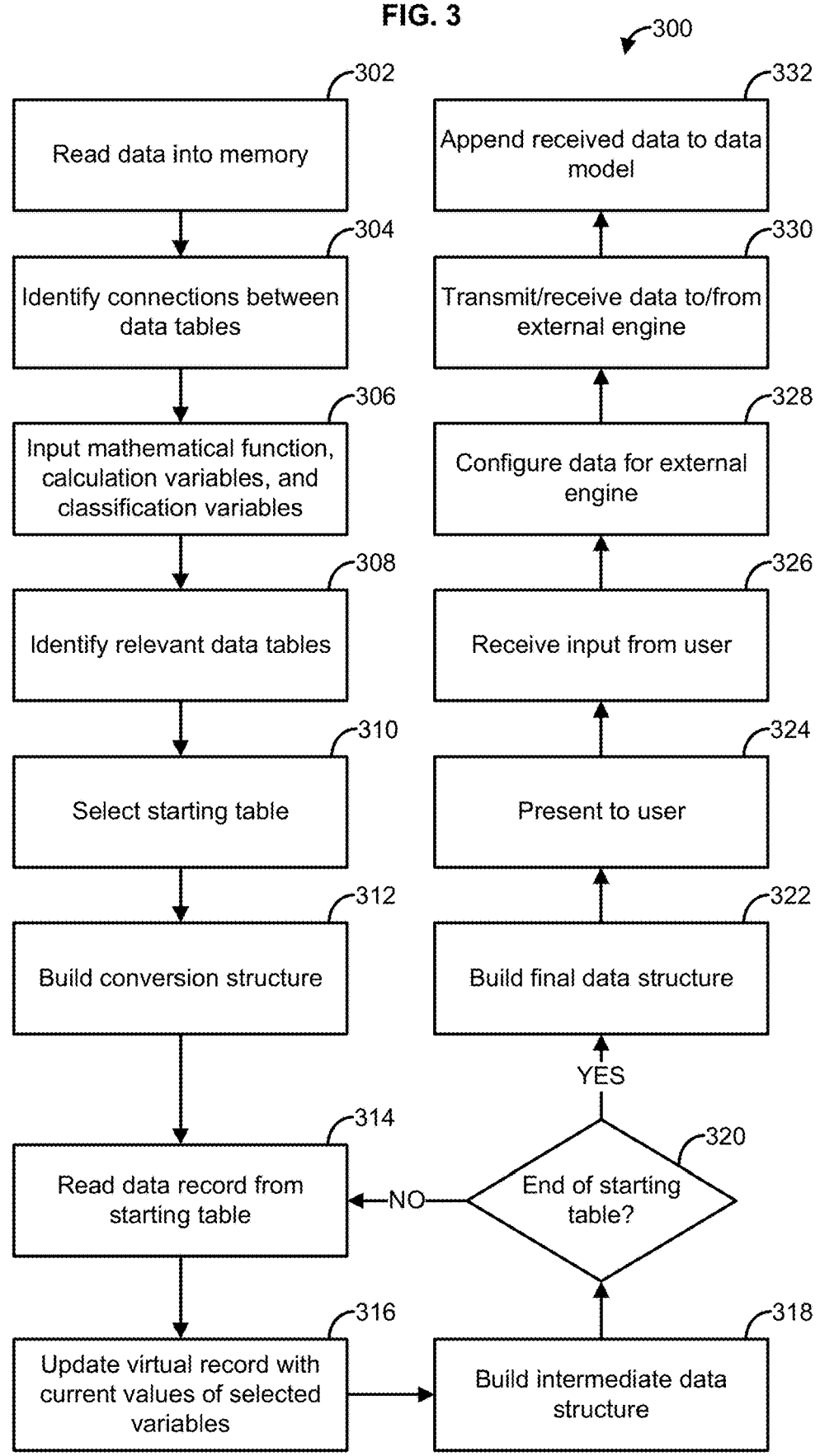
FIG. 3 is a schematic flowchart showing basic steps performed when extracting information from a database.

The methods provided can be implemented by means of a computer program as illustrated in a flowchart of a method 300 in FIG. 3. In a step 302, the program can read some or all data records in the database, for instance using a SELECT statement which selects all the tables of the database, e.g. Tables 1-5. In an aspect, the database can be read into primary memory of a computer.

To increase evaluation speed, each unique value of each data variable in said database can be assigned a different binary code and the data records can be stored in binary-coded form. This can be performed, for example, when the program first reads the data records from the database. For each input table, the following steps can be carried out. The column names, e.g. the variables, of the table can be read (e.g., successively). Every time a new data variable appears, a data structure can be instantiated for the new data variable. An internal table structure can be instantiated to contain some or all the data records in binary form, whereupon the data records can be read (e.g., successively) and binary-coded. For each data value, the data structure of the corresponding data variable can be checked to establish if the value has previously been assigned a binary code. If so, that binary code can be inserted in the proper place in the above-mentioned table structure. If not, the data value can be added to the data structure and assigned a new binary code, for example the next binary code in ascending order, before being inserted in the table structure. In other words, for each data variable, a unique binary code can be assigned to each unique data value.

After having read some or all data records in the database, the program can analyze the database in a step 304 to identify all connections between the data tables. A connection between two data tables means that these data tables have one variable in common. In an aspect, step 304 can comprise generation of one or more bidirectional table indexes and one or more bidirectional associative indexes. In an aspect, generation of one or more bidirectional table indexes and one or more bidirectional associative indexes can comprise a separate step. In another aspect, generation of one or more bidirectional table indexes and one or more bidirectional associative indexes can be on demand. After the analysis, all data tables are virtually connected. In FIG. 2, such virtual connections are illustrated by double ended arrows. The virtually connected data tables can form at least one so-called "snowflake structure," a branching data structure in which there is one and only one connecting path between any two data tables in the database. Thus, a snowflake structure does not contain any loops. If loops do occur among the virtually connected data tables, e.g. if two tables have more than one variable in common, a snowflake structure can in some cases still be formed by means of special algorithms known in the art for resolving such loops.

After this initial analysis, the user can explore the database. In doing so, the user defines in a step 306 a mathematical function, which could be a combination of mathematical expressions. Assume that the user wants to extract the total sales per year and client from the database in FIG. 2. The user defines a corresponding mathematical function "SUM (x*y)", and selects the calculation variables to be included in this function: "Price" and "Number." The user also selects the classification variables: "Client" and "Year."

The computer program then identifies in a step 308 all relevant data tables, e.g. all data tables containing any one of the selected calculation and classification variables, such data tables being denoted boundary tables, as well as intermediate data tables in the connecting path(s) between these boundary tables in the snowflake structure, such data tables being denoted connecting tables. There are no connecting tables in the present example. In an aspect, one or more bidirectional table indexes and one or more bidirectional associative indexes can be accessed as part of step 308.

In the present example, all occurrences of every value, e.g. frequency data, of the selected calculation variables can be included for evaluation of the mathematical function. In FIG. 2, the selected variables ("Price," "Number") can require such frequency data. Now, a subset (B) can be defined that includes all boundary tables (Tables 1-2) containing such calculation variables and any connecting tables between such boundary tables in the snowflake structure. It should be noted that the frequency requirement of a particular variable is determined by the mathematical expression in which it is included.

Determination of an average or a median calls for frequency information. In general, the same is true for determination of a sum, whereas determination of a maximum or a minimum does not require frequency data of the calculation variables. It can also be noted that classification variables in general do not require frequency data.

Then, a starting table can be selected in a step 310, for example, among the data tables within subset (B). In an aspect, the starting table can be the data table with the largest number of data records in this subset. In FIG. 2, Table 2 can be selected as the starting table. Thus, the starting table contains selected variables ("Client," "Number"), and connecting variables ("Date," "Product"). These connecting variables link the starting table (Table 2) to the boundary tables (Tables 1 and 3).

Thereafter, a conversion structure can be built in a step 312. This conversion structure can be used for translating each value of each connecting variable ("Date," "Product") in the starting table (Table 2) into a value of a corresponding selected variable ("Year," "Price") in the boundary tables (Table 3 and 1, respectively). A table of the conversion structure can be built by successively reading data records of Table 3 and creating a link between each unique value of the connecting variable ("Date") and a corresponding value of the selected variable ("Year"). It can be noted that there is no link from value 4 ("Date: 1999 Jan. 12"), since this value is not included in the boundary table. Similarly, a further table of the conversion structure can be built by successively reading data records of Table 1 and creating a link between each unique value of the connecting variable ("Product") and a corresponding value of the selected variable ("Price"). In this example, value 2 ("Product: Toothpaste") is linked to two values of the selected variable ("Price: 6.5"), since this connection occurs twice in the boundary table. Thus, frequency data can be included in the conversion structure. Also note that there is no link from value 3 ("Product: Shampoo").

When the conversion structure has been built, a virtual data record can be created. Such a virtual data record accommodates all selected variables ("Client," "Year," "Price," "Number") in the database. In building the virtual data record, a data record is read in a step 314 from the starting table (Table 2). Then, the value of each selected variable ("Client", "Number") in the current data record of the starting table can be incorporated in the virtual data record in a step 316. Also, by using the conversion structure each value of each connecting variable ("Date", "Product") in the current data record of the starting table can be converted into a value of a corresponding selected variable ("Year", "Price"), this value also being incorporated in the virtual data record.

In a step 318 the virtual data record can be used to build an intermediate data structure. Each data record of the intermediate data structure can accommodate each selected classification variable (dimension) and an aggregation field for each mathematical expression implied by the mathematical function. The intermediate data structure can be built based on the values of the selected variables in the virtual data record. Thus, each mathematical expression can be evaluated based on one or more values of one or more relevant calculation variables in the virtual data record, and the result can be aggregated in the appropriate aggregation field based on the combination of current values of the classification variables ("Client," "Year").

The above procedure can be repeated for one or more additional (e.g., all) data records of the starting table. In a step 320 it can be checked whether the end of the starting table has been reached. If not, the process can be repeated from step 314 and further data records can be read from the starting table. Thus, an intermediate data structure can be built by successively reading data records of the starting table, by incorporating the current values of the selected variables in a virtual data record, and by evaluating each mathematical expression based on the content of the virtual data record. If the current combination of values of classification variables in the virtual data record is new, a new data record can be created in the intermediate data structure to hold the result of the evaluation. Otherwise, the appropriate data record is rapidly found, and the result of the evaluation is aggregated in the aggregation field.

Thus, data records can be added to the intermediate data structure as the starting table is traversed. The intermediate data structure can be a data table associated with an efficient index system, such as an AVL or a hash structure. The aggregation field can be implemented as a summation register, in which the result of the evaluated mathematical expression is accumulated.

In some aspects, e.g. when evaluating a median, the aggregation field can be implemented to hold all individual results for a unique combination of values of the specified classification variables. It should be noted that only one virtual data record is needed in the procedure of building the intermediate data structure from the starting table. Thus, the content of the virtual data record can be updated for each data record of the starting table. This can minimize the memory requirement in executing the computer program.

After traversing the starting table, the intermediate data structure can contain a plurality of data records. If the intermediate data structure accommodates more than two classification variables, the intermediate data structure can, for each eliminated classification variable, contain the evaluated results aggregated over all values of this classification variable for each unique combination of values of remaining classification variables.

When the intermediate data structure has been built, a final data structure, e.g., a multidimensional cube, as shown in non-binary notation in Table 6 of FIG. 4, can be created in a step 322 by evaluating the mathematical function ("SUM (x*y)") based on the results of the mathematical expression ("x*y") contained in the intermediate data structure. In doing so, the results in the aggregation fields for each unique combination of values of the classification variables can be combined. In the example, the creation of the final data structure is straightforward, due to the trivial nature of the present mathematical function. The content of the final data structure can be presented to the user, for example in a two-dimensional table, in a step 324, as shown in Table 7 of FIG. 4. Alternatively, if the final data structure contains many dimensions, the data can be presented in a pivot table, in which the user can interactively move up and down in dimensions, as is well known in the art. At step 326, input from the user can be received. For example, input form the user can be a selection and/or de-selection of the presented results.

Optionally, input from the user at step 326 can comprise a request for external processing. In an aspect, the user can be presented with an option to select one or more external engines to use for the external processing. Optionally, at step 328, data underlying the user selection can be configured (e.g., formatted) for use by an external engine. Optionally, at step 330, the data can be transmitted to the external engine for processing and the processed data can be received. The received data can undergo one or more checks to confirm that the received data is in a form that can be appended to the data model. For example, one or more of an integrity check, a format check, a cardinality check, combinations thereof, and the like. Optionally, at step 332, processed data can be received from the external engine and can be appended to the data model as described herein. In an aspect, the received data can have a lifespan that controls how long the received data persists with the data model. For example, the received data can be incorporated into the data model in a manner that enables a user to retrieve the received data at another time/session. In another example, the received data can persist only for the current session, making the received data unavailable in a future session.

Figure 5A:
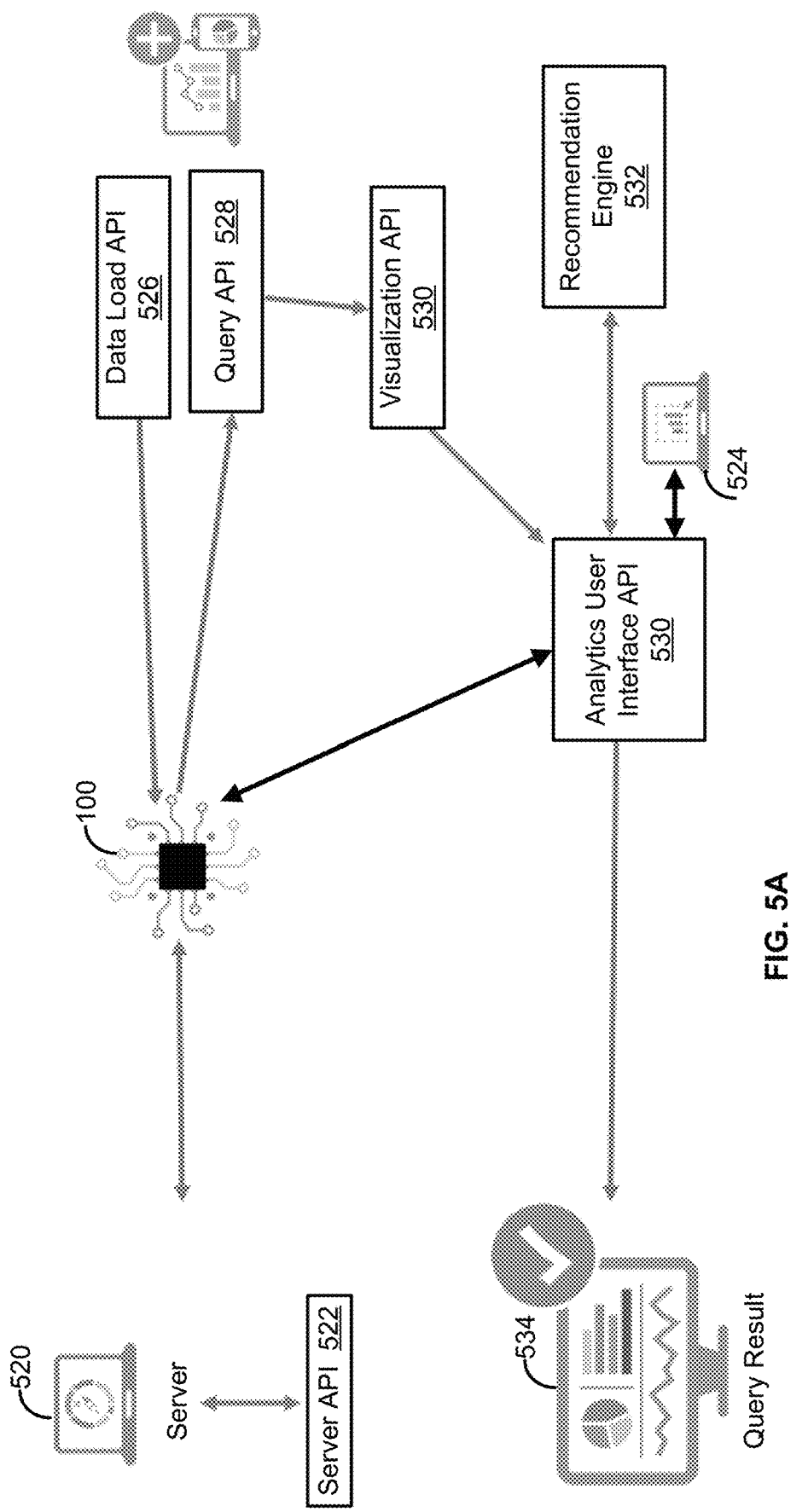
FIG. 5A is a schematic diagram showing an embodiment of a system forming an implementation of the disclosed methods.

FIG. 5A shows a schematic diagram of an example system for implementing the methods described herein. A server 520 may provide data 102 to the associative data indexing engine 100 based on a query entered by a user at a user device 524, such as a computer, a mobile device, etc., via an analytics user interface application programming interface ("API") 530. The server 520 may be in communication with a server API 522, such as a Python API, which may be used as an implementation layer of server-side extensions that provide analytics functions. Based on content of the query entered at the analytics user interface, such as keywords, phrases, contexts, etc., the analytics user interface API 530 may receive one or more recommendations from a recommendation engine 532 that are provided to the user device 524 for selection by the user via the analytics user interface.

The recommendation engine 532 may have a machine learning module that stores one or more models that may be associated with some, or all, content of the query. The one or more models may include one or more result elements (e.g., filters to be applied to data associated with the query) and associated visualizations (e.g., types of charts, graphs, tables, etc.) to represent a query result. The query result may include a portion of a dataset associated with the query. The portion of data that is included in the query result may be based on one or more result elements that are recommended to the user by the recommendation engine 532 and selected by the user via the analytics user interface.

The recommendation engine 532 may use machine learning to train the machine learning module based on an analysis of training datasets relating to a plurality of queries associated with the training datasets. The machine learning module may be capable of identifying result elements and/or visualization elements that are related to content of a query entered by the user at the analytics user interface. The recommendation engine 532 may train the machine learning module by, for each training dataset, extracting a feature set from the training dataset that includes statistically significant features of positive examples of result elements and associated visualization elements within the training data set and statistically significant features of negative examples of result elements and associated visualization elements within the training dataset. Using the feature set, the recommendation engine 532 may build a machine learning-based classification model that is capable of identifying result elements and associated visualization elements based on content of the query entered by the user.

The recommendation engine 532 may extract a feature set from a training dataset in a variety of ways. For example, a weight may be associated with each extracted feature in order to indicate the relative importance of that feature relative to other features. The recommendation engine 532 may (1) determine a frequency of occurrence of various features (e.g., words of the query) within both the positive and negative examples within a training dataset, (2) rank these positive features and negative features based on, for example, frequency of occurrence, and then (3) select the highest ranked features for inclusion within a feature set. The weight associated with each feature may be the frequency of occurrence of the specific feature. The recommendation engine 532 may filter out commonly used words during this process, such as "the," "it," "and," "or," etc.

After the recommendation engine 532 has generated a feature set for a particular training dataset, the recommendation engine 532 may generate a machine learning-based classification model based on the feature set. The phrase "machine learning-based classification model," as used herein, may refer to a complex mathematical model for data classification that may be generated using machine learning techniques. The machine learning module may include a map of support vectors that represent boundary features. These boundary features may be selected from, and/or represent the highest-ranked features in, a feature set. These boundary features may be projected into a multidimensional vector space using an embedding matrix, which may contain a weight for each support vector. The weights in the embedding matrix may be determined through a backpropagation procedure, as discussed below.

The weights assigned to each extracted feature may be determined through backpropagation of a loss of an objective function, which compares probabilities that each recommended result element and/or selected visualization element is a positive example (e.g., to determine whether a recommended result element and/or selected visualization element is "correct" with respect to an intent of a user when entering a given query).

In order to dynamically display or otherwise present recommended result elements and/or associated visualization elements to a user at or near real-time, in certain embodiments, the machine learning module may pre-compute, pre-determine, and/or pre-cache different permutations of the recommended result elements and/or associated visualization elements. Pre-computing each permutation of recommended result elements and/or associated visualization elements, indexed by machine learning input parameters, in certain embodiments, allows the machine learning module to dynamically update recommended result elements and/or associated visualization elements and/or other parameters with little or no delay in response to receiving input from the user, without having to process each new user input.

The machine learning module may process each instance of a user query within the dataset to generate a new set of predictive metrics (e.g., machine learning results). The machine learning module may perform this processing of data iteratively for each instance, deriving a new set of predictive metrics or other machine learning results for each iteration. The accumulation of each of the predictive metrics or machine learning results gathered after processing each of the different instances by the machine learning module may populate a table or other results data structure of predictive, machine learning information (e.g., machine learning inputs, machine learning results, and/or other machine learning parameters) that is pre-processed and readily accessible by the machine learning module for presentation to a user with direct correlation between the various actions. The table or other results data structure may include up to millions of predictions or other machine learning results. This table or other results data structure may accommodate user interaction with the predictive metrics recommended by the recommendation engine 532 in a substantially real-time manner.

The analytics user interface API 530, in certain embodiments, provides an analytics user interface that is an adaptive, interactive, and visual representation of the pre-computed and/or pre-cached machine learning data, using a visual method to define a query result to be displayed. This may facilitate the ability of a user to see a simulation or representation of any possible action as they relate to a query result, based on pre-computed machine learning processing of the plurality of recommended result elements and associated visualization elements.

The machine learning module may, via the analytics user interface and the analytics user interface API 530, dynamically display and update query results by showing a user what result elements are recommended to obtain a desired query result (e.g., a visualization), while allowing the user to update or change input parameters, result elements, etc., in real-time. The analytics user interface may allow a user to manipulate its content, in an interactive manner, in order to simulate pre-computed machine learning results, which may dictate a specific list of result elements that are required to obtain a desired query result (e.g., a visualization).

The machine learning module may, via the analytics user interface and the analytics user interface API 530, display recommended result elements based on the content of the query. The recommendation engine 532 may monitor user input via the analytics user interface API 530 to detect or otherwise receive user selection(s) of one or more of the recommended result elements. The machine learning module may determine adjustments, updates, or other changes to the remaining recommended result elements based on the user selection(s) of the one or more of the recommended result elements. In an aspect, the machine learning module may be configured to select a suggested or optimal set of recommended result elements to initially display to the user prior to the analytics user interface API 530 receiving user input, as a set of default or recommended result elements or the like.

Based on the user's selected result element(s), the associative data indexing engine 100 may be instructed by a data load API 526 on what portions of the dataset associated with the query are to be retrieved and manipulated (e.g., visualized). Once the portions of the dataset are retrieved by the associative data indexing engine 100, a query API 528 may cause the associative data indexing engine 100 to execute one or more analytics queries based on the query entered by the user at the analytics user interface. The associative data indexing engine 100 may generate query result data based on the one or more analytics queries that are executed. The query result may be provided to a visualization API 530 for rendering of the query result data based on the visualization element associated with the one or more result elements that were recommended to the user by the recommendation engine 532 and selected via the analytics user interface. The rendered query result data may be provided to the analytics user interface API 530 and displayed at the user device 524 as a query result 534 (e.g., a chart, graph, table, a combination thereof, and/or the like).

Figure 5B:
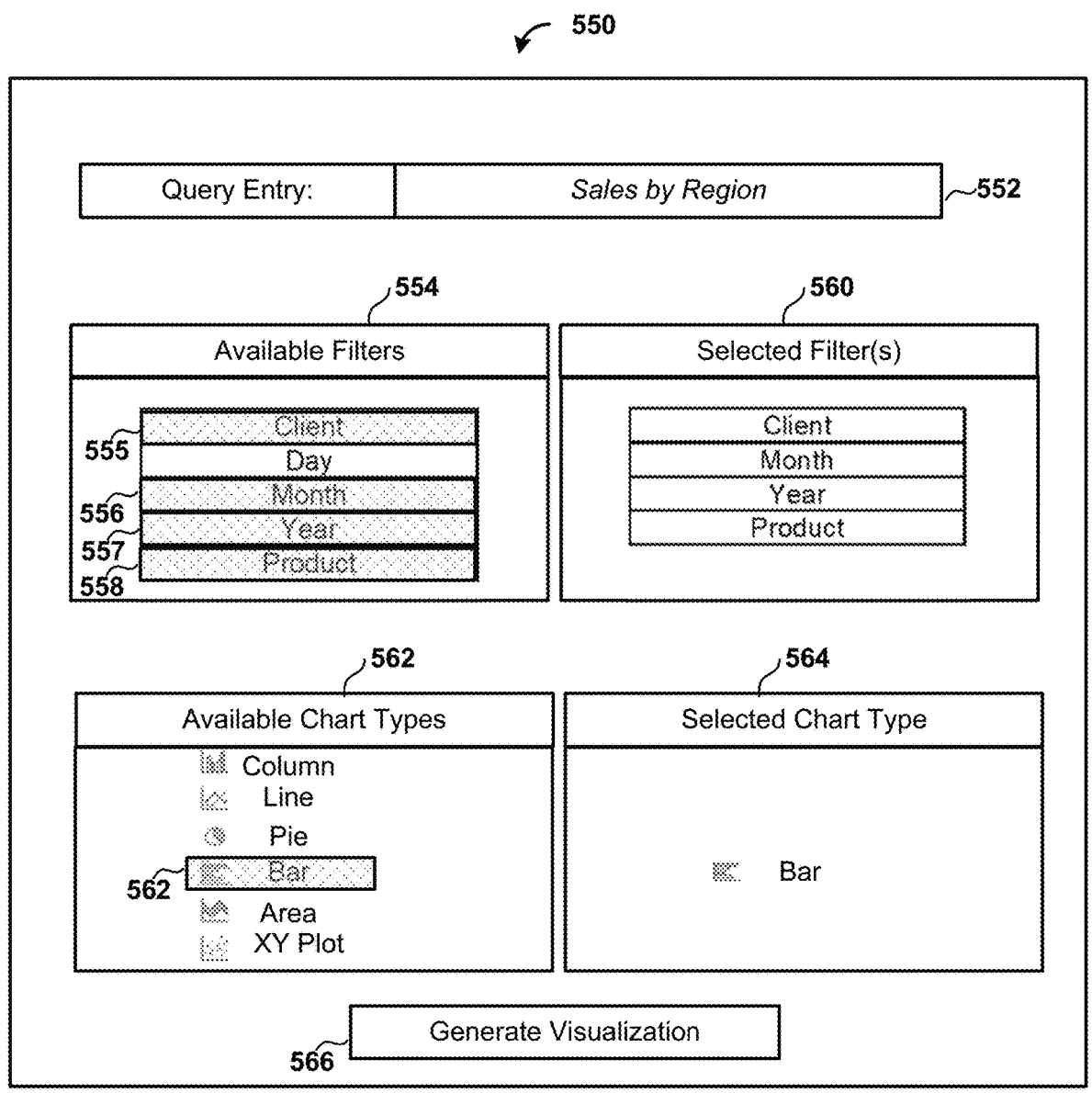
FIG. 5B is a schematic diagram showing an exemplary user interface.

FIG. 5B shows an example analytics user interface 550 that may be implemented by the analytics user interface API 530 and displayed at the user device 524. A user of the analytics user interface 550 may enter a query at a query entry toolbar 552. Based on content of the query, a plurality of result elements 554 (e.g., filters) may be presented at the analytics user interface 550 for selection by the user. The analytics user interface 550 may indicate one or more recommended result elements 555, 556, 557, 558 based on the content of the query and one or more machine learning models stored in the machine learning module of the recommendation engine 532. The user may select one or more of the plurality of result elements, which may be displayed at the analytics user interface 550 as a list 560 of one or more selected result elements. Based on content of the query, a plurality of visualization elements 554 (e.g., types of charts, graphs, tables, etc.) may be presented at the analytics user interface 550 for selection by the user. The plurality of visualization elements 554 may be associated with the result elements that were selected by the user from the plurality of result elements 554 and displayed in the list 560. The analytics user interface 550 may indicate one, or more than one, recommended visualization element 562 based on the result elements selected by the user, the content of the query, and/or one or more machine learning models stored in the machine learning module of the recommendation engine 532. The user may select a visualization element, which may be displayed at the analytics user interface 550 as a list 564.

Figure 5C:
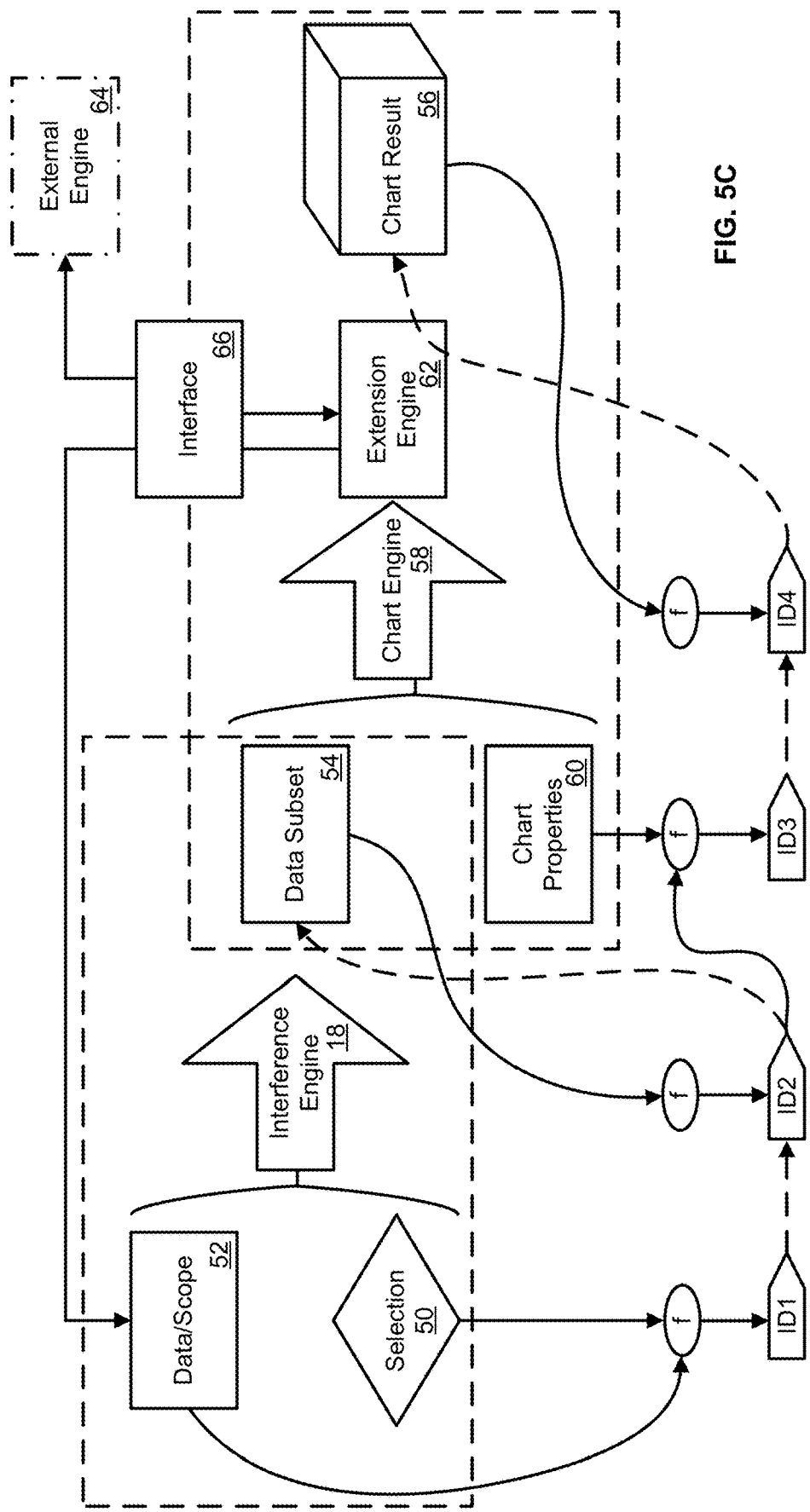
FIG. 5C is a schematic diagram showing an embodiment of a system forming an implementation of the disclosed methods.

The one or more result elements selected by the user may define a scope of data (e.g., a portion of the dataset associated with the query) that is to be presented to the user at the analytics user interface 550. FIG. 5C illustrates how a selection 50 operates on a scope 52 of presented data to generate a data subset 54. The data subset 54 can form a state space, which is based on a selection state given by the selection 50. In an aspect, the selection state (or "user state") can be defined by a user clicking on list boxes and graphs in a user interface of an application. An application can be designed to host a number of graphical objects (charts, tables, etc.) that evaluate one or more mathematical functions (also referred to as an "expression") on the data subset 54 for one or more dimensions (classification variables). The result of this evaluation creates a chart result 56 which can be a multidimensional cube which can be visualized in one or more of the graphical objects.

The analytics user interface 550 can permit a user to explore the scope 52 by making different selections, by clicking on graphical objects to select variables, which causes the chart result 56 to change. At every time instant during the exploration, there exists a current state space, which can be associated with a current selection state that is operated on the scope 52 (which always remains the same).

As illustrated in FIG. 5C, when a user makes a selection, the inference engine 18 calculates a data subset. Also, an identifier ID1 for the selection together with the scope can be generated based on the filters in the selection and the scope. Subsequently, an identifier ID2 for the data subset is generated based on the data subset definition, for example a bit sequence that defines the content of the data subset. ID2 can be put into a cache using ID1 as a lookup identifier. Likewise, the data subset definition can be put in the cache using ID2 as a lookup identifier.

As shown in FIG. 5C, a chart calculation in a calculation/chart engine 58 takes place in a similar way. Here, there are two information sets: the data subset 54 and relevant chart properties 60. The latter can be, but not restricted to, a mathematical function together with calculation variables and classification variables (dimensions). Both of these information sets can be used to calculate the chart result 56, and both of these information sets can be also used to generate identifier ID3 for the input to the chart calculation. ID2 can be generated already in the previous step, and ID3 can be generated as the first step in the chart calculation procedure.

The identifier ID3 can be formed from ID2 and the relevant chart properties. ID3 can be seen as an identifier for a specific chart generation instance, which can include all information needed to calculate a specific chart result. In addition, a chart result identifier ID4 can be created from the chart result definition, for example a bit sequence that defines the chart result 56. ID4 can be put in the cache using ID3 as a lookup identifier. Likewise, the chart result definition can be put in the cache using ID4 as a lookup identifier.

Optionally, further calculations, transforming, and/or processing can be included through an extension engine 62. Optionally, associated results from the inference engine 18 and further computed by hypercube computation in said calculation/chart engine 58 can be coupled to an external engine 64 that can comprise one or more data processing applications (e.g., simulation applications, statistical applications, mathematical computation applications, database applications, combinations thereof, and the like). Context of a data model processed by the inference engine 18 can comprise a tuple or tuples of values defined by dimensions and expressions computed by hypercube routines. Data can be exchanged through an interface 66.

The associated results coupled to the external engine 64 can be intermediate. Further results that can be final hypercube results can also be received from the external engine 64. Further results can be fed back to be included in the Data/Scope 52 and enrich the data model. The further results can also be rendered directly to the user in the chart result 56. Data received from and computed by the external engine 64 can be used for further associative discovery.

Each of the data elements of the database shown in Tables 1-5 of FIG. 2 has a data element type and a data element value (for example "Client" is the data element type and "Nisse" is the data element value). Multiple records can be stored in different database structures such as data cubes, data arrays, data strings, flat files, lists, vectors, and the like; and the number of database structures can be greater than or equal to one and can comprise multiple types and combinations of database structures. While these and other database structures can be used with, and as part of, the methods and systems disclosed, the remaining description will refer to tables, vectors, strings and data cubes solely for convenience.

Additional database structures can be included within the database illustrated as an example herein, with such structures including additional information pertinent to the database such as, in the case of products for example; color, optional packages, etc. Each table can comprise a header row which can identify the various data element types, often referred to as the dimensions or the fields, that are included within the table. Each table can also have one or more additional rows which comprise the various records making up the table. Each of the rows can contain data element values (including null) for the various data element types comprising the record.

The database as referred to in Tables 1-5 of FIG. 2 can be queried by specifying the data element types and data element values of interest and by further specifying any functions to apply to the data contained within the specified data element types of the database. The functions which can be used within a query can include, for example, expressions using statistics, sub-queries, filters, mathematical formulas, and the like, to help the user to locate and/or calculate the specific information wanted from the database. Once located and/or calculated, the results of a query can be displayed to the user with various visualization techniques and objects such as list boxes of a user interface illustrated in FIG. 6.

The graphical objects (or visual representations) can be substantially any display or output type including graphs, charts, trees, multi-dimensional depictions, images (computer generated or digital captures), video/audio displays describing the data, hybrid presentations where output is segmented into multiple display areas having different data analysis in each area and so forth. A user can select one or more default visual representations; however, a subsequent visual representation can be generated on the basis of further analysis and subsequent dynamic selection of the most suitable form for the data.

In an aspect, a user can select a data point and a visualization component can instantaneously filter and re-aggregate other fields and corresponding visual representations based on the user's selection. In an aspect, the filtering and re-aggregation can be completed without querying a database. In an aspect, a visual representation can be presented to a user with color schemes applied meaningfully. For example, a user selection can be highlighted in green, datasets related to the selection can be highlighted in white, and unrelated data can be highlighted in gray. A meaningful application of a color scheme provides an intuitive navigation interface in the state space.

Figures 6, 7:
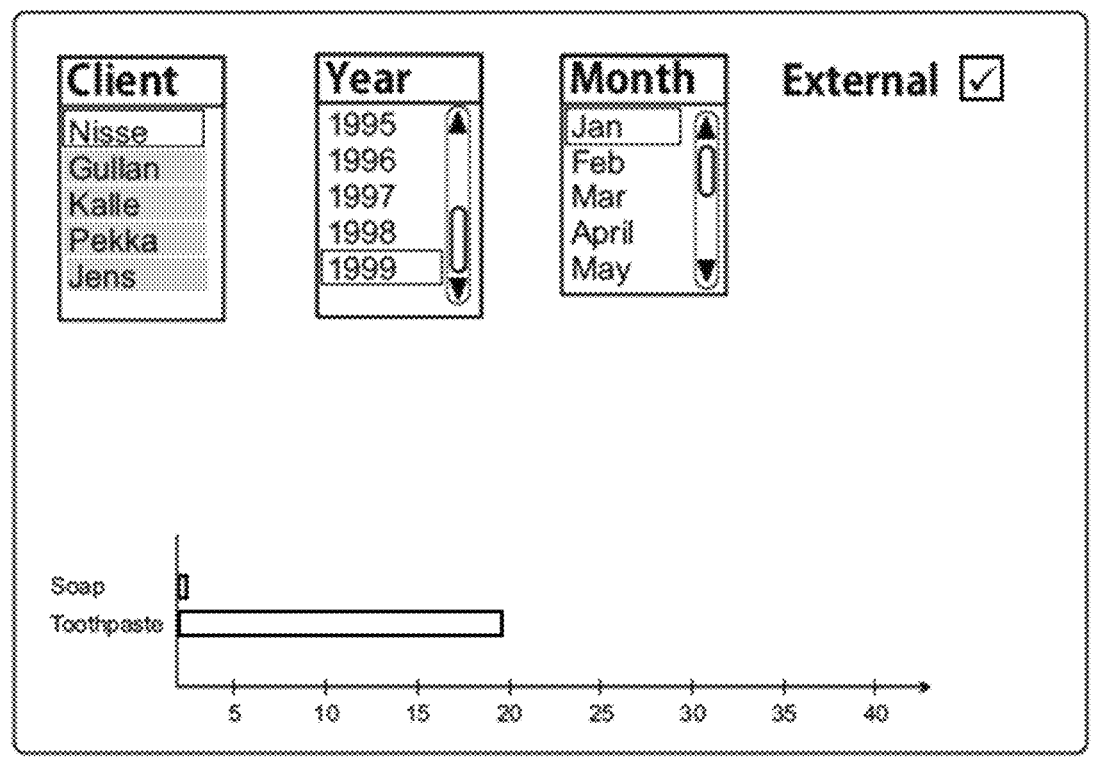
FIG. 6 is a schematic graphical presentation showing selections and a diagram of data associated to the selections as received after processing by an external engine.
FIG. 7 is a schematic representation of data exchanged with an external engine based on selections in FIG. 6.

The result of a standard query can be a smaller subset of the data within the database, or a result set, which is comprised of the records, and more specifically, the data element types and data element values within those records, along with any calculated functions, that match the specified query. For example, as indicated in FIG. 6, the data element value "Nisse" can be specified as a query or filtering criteria as indicated by a frame in the "Client" header row. In some aspects, the selected element can be highlighted in green. By specifically selecting "Nisse," other data element values in this row are excluded as shown by gray areas. Further, "Year" "1999" and "Month" "Jan" are selected in a similar way.

Optionally, in this application, external processing can also be requested by ticking "External" in the user interface of FIG. 6. Data as shown in FIG. 7 can be exchanged with an External engine 64 through the interface 66 of FIG. 5. In addition to evaluating the mathematical function ("SUM (Price*Number)") based on the results of the mathematical expression ("Price*Number") contained in the intermediate data structure the mathematical function ("SUM (ExtFunc (Price*Number))") can be evaluated. Data sent out are (Nisse, 1999, January, {19.5, null}). In this case the external engine 64 can process data in accordance with the formula $$\text{if } (x==\text{null})$$
$$y=0.5$$
$$\text{else}$$
$$y=x$$

as shown in in FIG. 7. The result input through the interface 66 will be (19.5, 0.5) as reflected in the graphical presentation in FIG. 6.

Figures 8, 9:
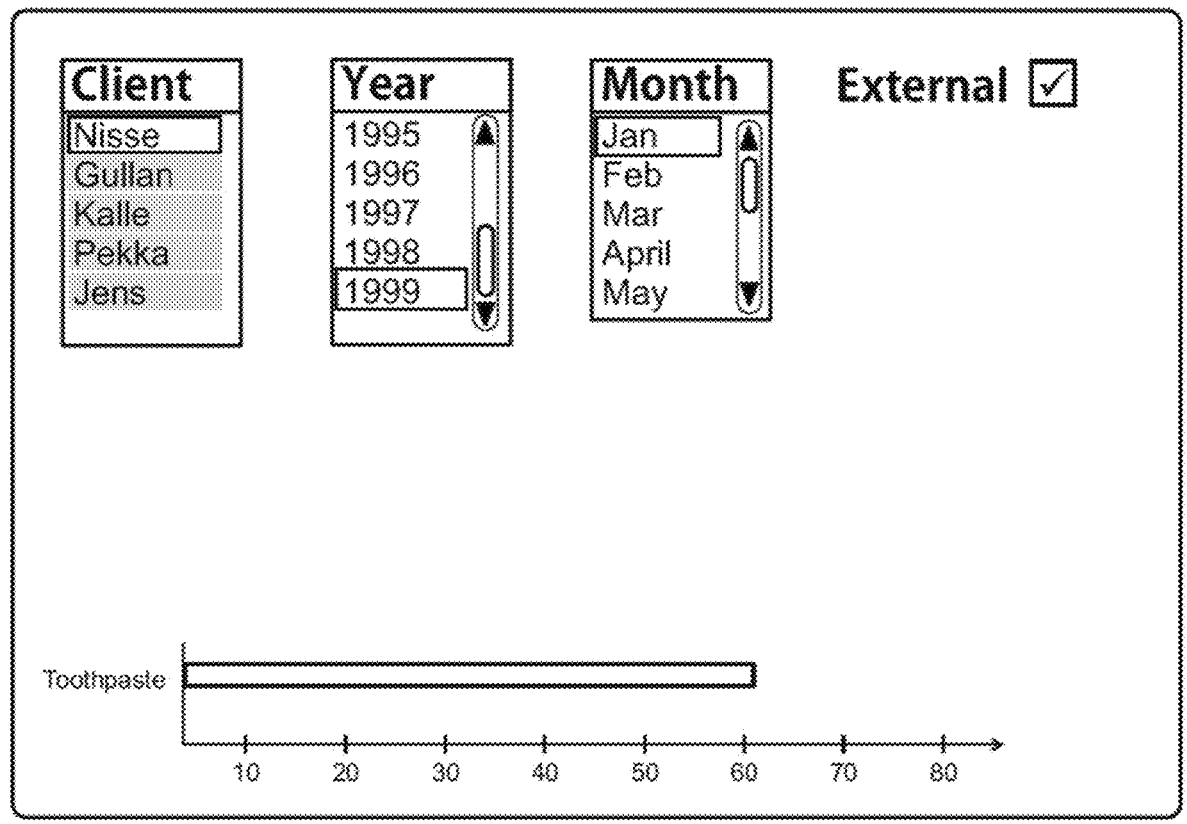
FIG. 8 is a schematic graphical presentation showing selections and a diagram of data associated to the selections as received after second computations from an external engine.
FIG. 9 is a schematic representation of data exchanged with an external engine based on selections in FIG. 8.

In a further aspect, external processing can also be optionally requested by ticking "External" in a box as shown in FIG. 8. Data as shown in FIG. 9 can be exchanged with an external engine 64 through the Interface 66 of FIG. 5. In addition to evaluating the mathematical function ("SUM (Price*Number)") based on the results of the mathematical expression ("Price*Number") contained in the intermediate data structure the mathematical function SUM(ExtFunc(Price*Number))

can be evaluated. Data sent out are (Nisse, 1999, Jan, {19.5, null}). In this case the external engine 64 will process data in accordance with Function (1) as shown below and in FIG. 9. The result input through the Interface 66 will be (61.5) as reflected in the graphical presentation in FIG. 8.

Function (1)

$$y=\text{ExtAggr}(x[\ ])$$
$$\text{for } (x \text{ in } x[\ ])$$
$$\text{if } (x==\text{null})$$
$$y=y+42$$
$$\text{else}$$
$$y=y+x$$

Figures 10, 11, 12:
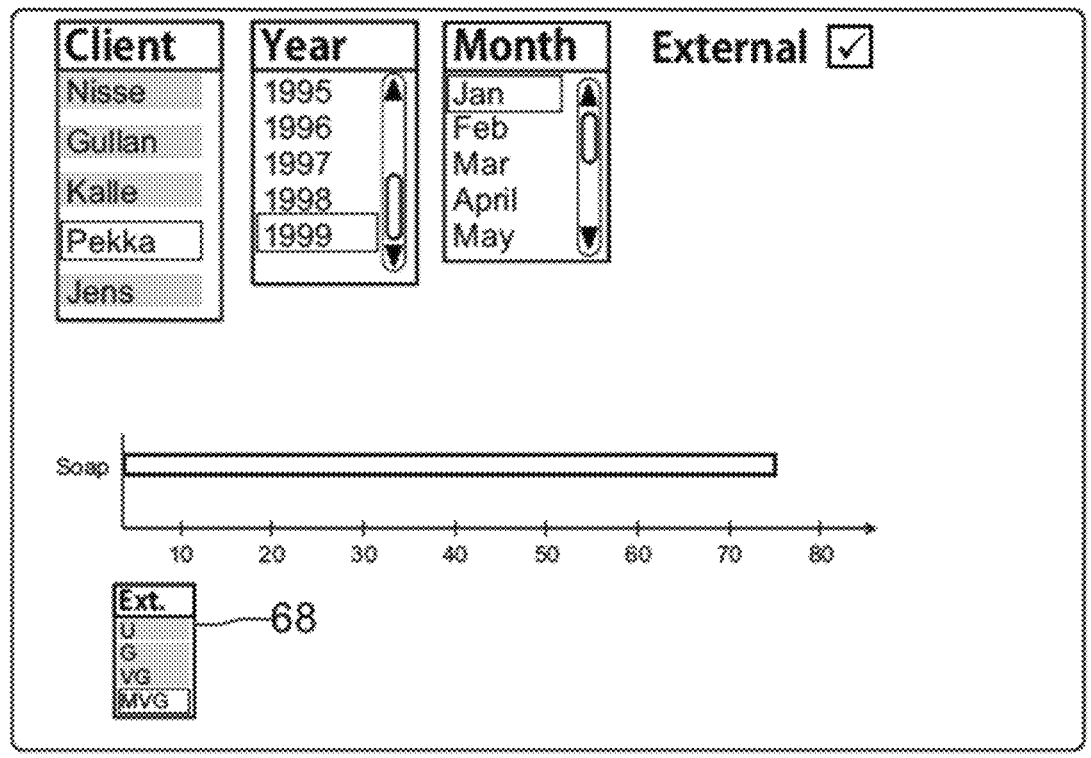
FIG. 10 is a schematic graphical presentation showing selections and a diagram of data associated to the selections as received after third computations from an external engine.
FIG. 11 is a schematic representation of data exchanged with an external engine based on selections in FIG. 10.
FIG. 12 is a table showing results from computations based on different selections in the presentation of FIG. 10.
Figure 13:
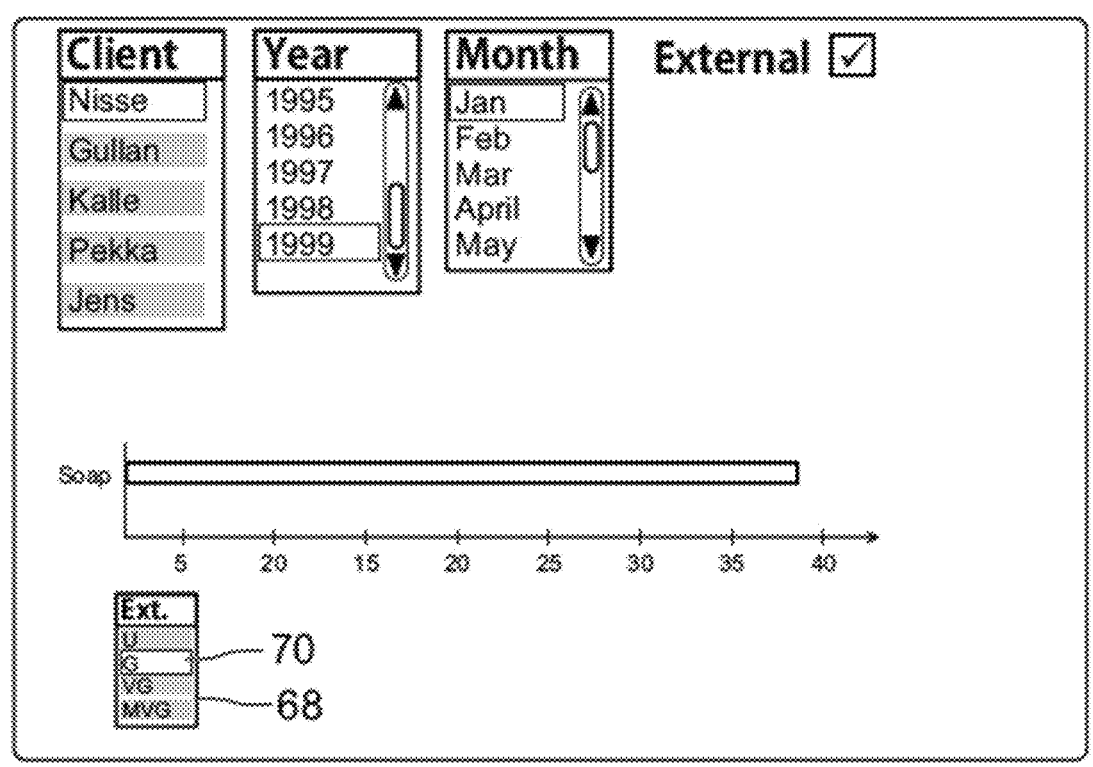
FIG. 13 is a schematic graphical presentation showing a further set of selections and a diagram of data associated to the selections as received after third computations from an external engine.

A further optional embodiment is shown in FIG. 10 and FIG. 11. The same basic data as in previous examples apply. A user selects "Pekka," "1999," "Jan," and "External." By selecting "External," already determined and associated results are coupled to the external engine 64. Feedback data from the external engine 64 based on an external computation, ExtQualification(Sum(Price*Number)), as shown in FIG. 13 will be the information "MVG." This information can be fed back to the logical inference engine 18. The information can also be fed back to the graphical objects of FIG. 10 and as a result a qualification table 68 will highlight "MVG" (illustrated with a frame in FIG. 10). Other values (U, G, and VG) are shown in gray areas. The result input through the Interface 66 will be Soap with a value of 75 as reflected in the graphical presentation (bar chart) of FIG. 10.

Should a user instead select "Gullan," "1999," "Jan," and "External," the feedback signal would include "VG" based on the content shown in qualification table 68. The computations actually performed in the external engine 62 are not shown or indicated, since they are not relevant to the inference engine.

In FIG. 13 a user has selected "G" as depicted by 70 in the qualification table 68. As a result information fed back from the external engine 64 to the external engine 62 and further to the inference engine 18 the following information will be highlighted: "Nisse," "1999," and "Jan" as shown in FIG. 13. Furthermore, the result produced will be Soap 37.5 as reflected in the graphical presentation (bar chart) of FIG. 13.

Figure 14:
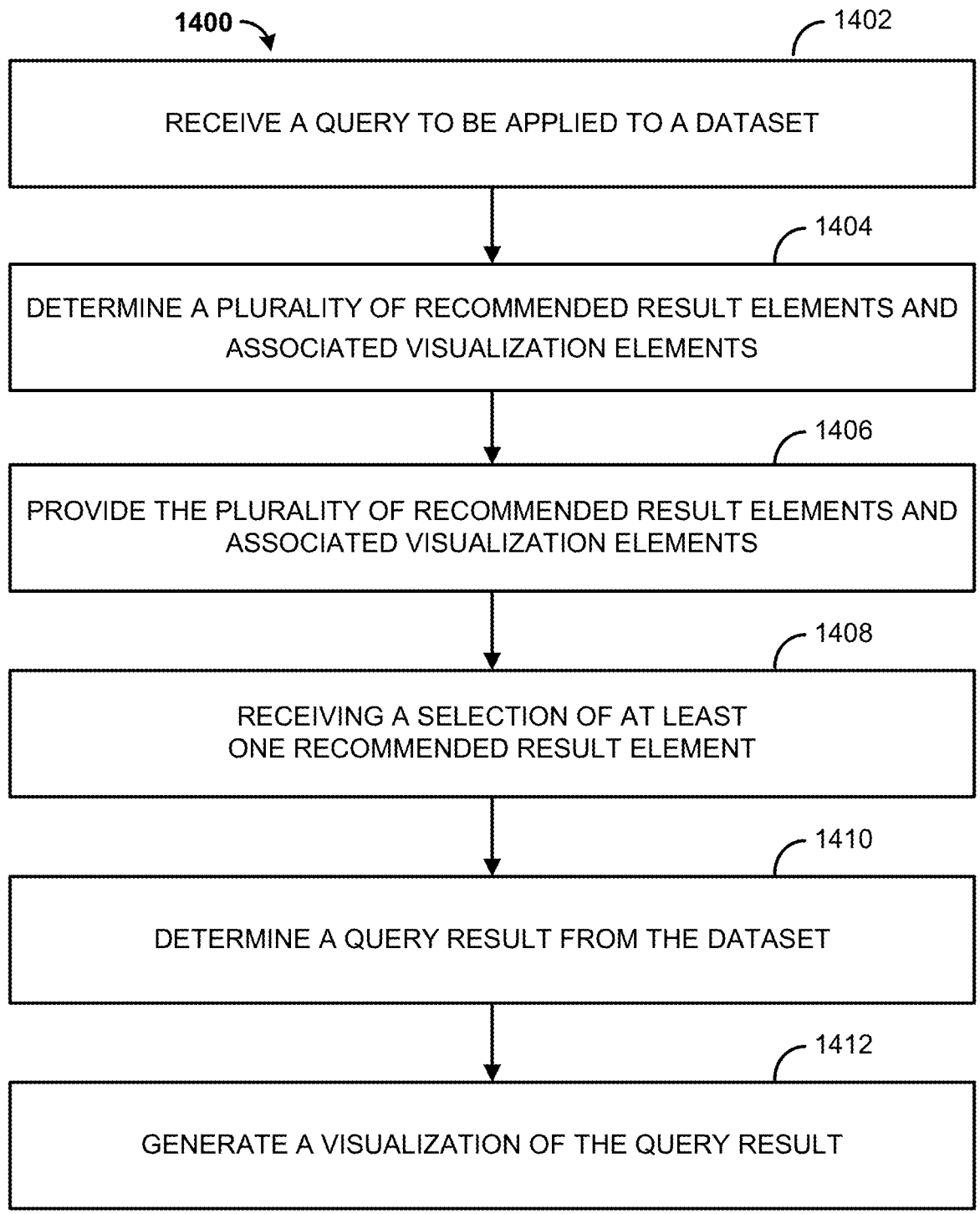
FIG. 14 is a flow chart illustrating an example method.

In an aspect, illustrated in FIG. 14 provided is a method 1400 for enabling an analytics user interface, such as the as the analytics user interfaces described above, to be adaptive based on, among other things, content of a query received from a user of the analytics user interface. At step 1402, a query to be applied to a dataset may be received (e.g., by a computing device) via an analytics user interface (e.g., analytics user interface 550). The query may be entered by a user of the analytics user interface at a user device (e.g., user device 524). At step 1404, based on the query and using a recommendation engine, such as recommendation engine 532, a plurality of recommended result elements and associated visualization elements may be determined. The plurality of recommended result elements may include, for example, one or more of a source of the dataset, one or more dimensions of the dataset (e.g., a scope), or one or more filters to apply to the dataset.

The recommendation engine may have a machine learning module that may be used to determine which of a number of result elements to include in the plurality of recommended result elements. The machine learning module may be trained using one or more training datasets by first receiving, via the analytics user interface, a query from a user and a selected result element. The selected result element may be one of a plurality of result elements. Based on the query and the selected result element, a query result from a dataset may be determined. The query result may include a portion (e.g., subset) of the dataset associated with the query. A selection of a visualization element from a plurality of visualization elements to apply to the query result may be received. A training dataset may be generated based on the query, the selected result element, and/or the selected visualization element. This training process may be repeated for at least one of, each query of a plurality of queries, each result element of the plurality of elements, or each visualization element of the plurality of visualization elements.

At step 1406, the plurality of recommended result elements and associated visualization elements may be provided via the analytics user interface. The plurality of recommended result elements and associated visualization elements may be provided based on an experience level associated with a user of the analytics user interface. The recommendation engine may, based on the query, determine one or more of an analysis intent associated with the query or a context associated with the query, and the plurality of recommended result elements may be determined based on one or more of the determined analysis intent or the determined context.

At step 1408, an indication of a selection (e.g., by the user via the analytics user interface) of at least one recommended result element of the plurality of recommended result elements may be received via the analytics user interface. A plurality of visualization elements associated with the selected at least one recommended result element may be provided to the user via the analytics user interface, and an indication of a selection (e.g., by the user via the analytics user interface) of a visualization element of the plurality of visualization elements may be received.

At step 1410, based on the query and the selected at least one recommended result element, a query result from the dataset associated with the query and the at least one result element may be determined. The query result may be generated based on the selected visualization element and the selected at least one recommended result element. At step 1412, based on the visualization element associated with the selected at least one recommended result element, a visualization of the query result may be generated and provided to the user via the analytics user interface.

Figure 15:
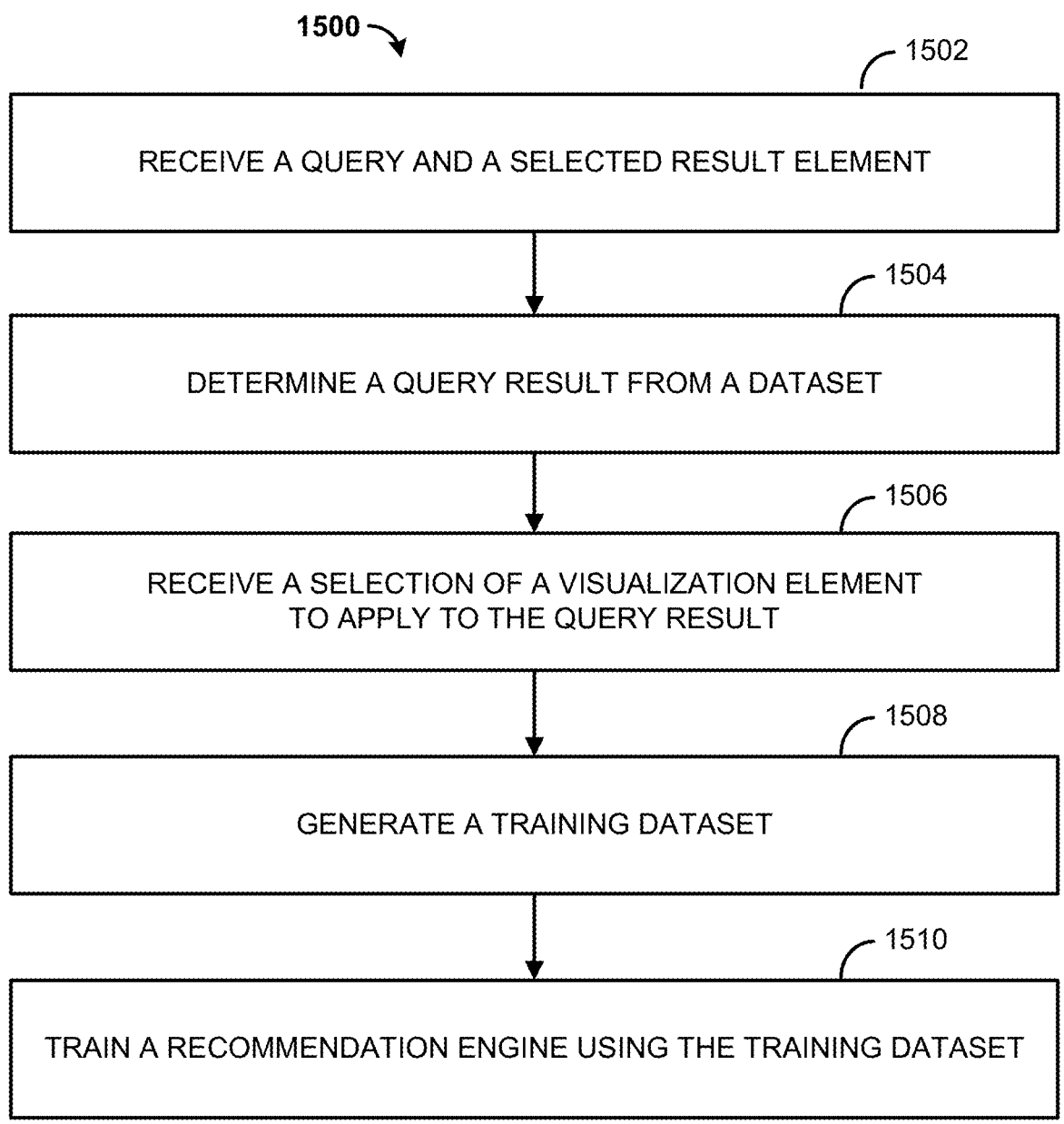
FIG. 15 is a flow chart illustrating an example method.

In another aspect, illustrated in FIG. 15, provided is a method 1500 for training a machine learning module of a recommendation engine (e.g., recommendation engine 532). The machine learning module may be trained using one or more training datasets by first, at step 1502, receiving, via an analytics user interface, a query from a user and a selected result element. The recommendation engine may determine, based on the query, one or more of an analysis intent associated with the query or a context associated with the query. The selected result element may be one of a plurality of result elements. The selected result element may be one or more of a source of a dataset associated with the query, one or more dimensions of the dataset, or one or more filters to apply to the dataset. The selected result element may be associated with one or more of the determined analysis intent or the determined context.

At step 1504, based on the query and the selected result element, a query result from a dataset may be determined. The query result may include a portion (e.g., subset) of the dataset associated with the query. At step 1506, a selection of a visualization element from a plurality of visualization elements to apply to the query result may be received. The selected visualization element may be associated with the selected result element. At step 1508, a training dataset may be generated based on the query, the selected result element, and/or the selected visualization element. At step 1510, the recommendation engine may be trained using the training dataset. This training process may be repeated for at least one of, each query of a plurality of queries, each result element of the plurality of elements, or each visualization element of the plurality of visualization elements. Each query of the plurality of queries may be associated with an experience level of a user of the analytics user interface.

Figure 16:
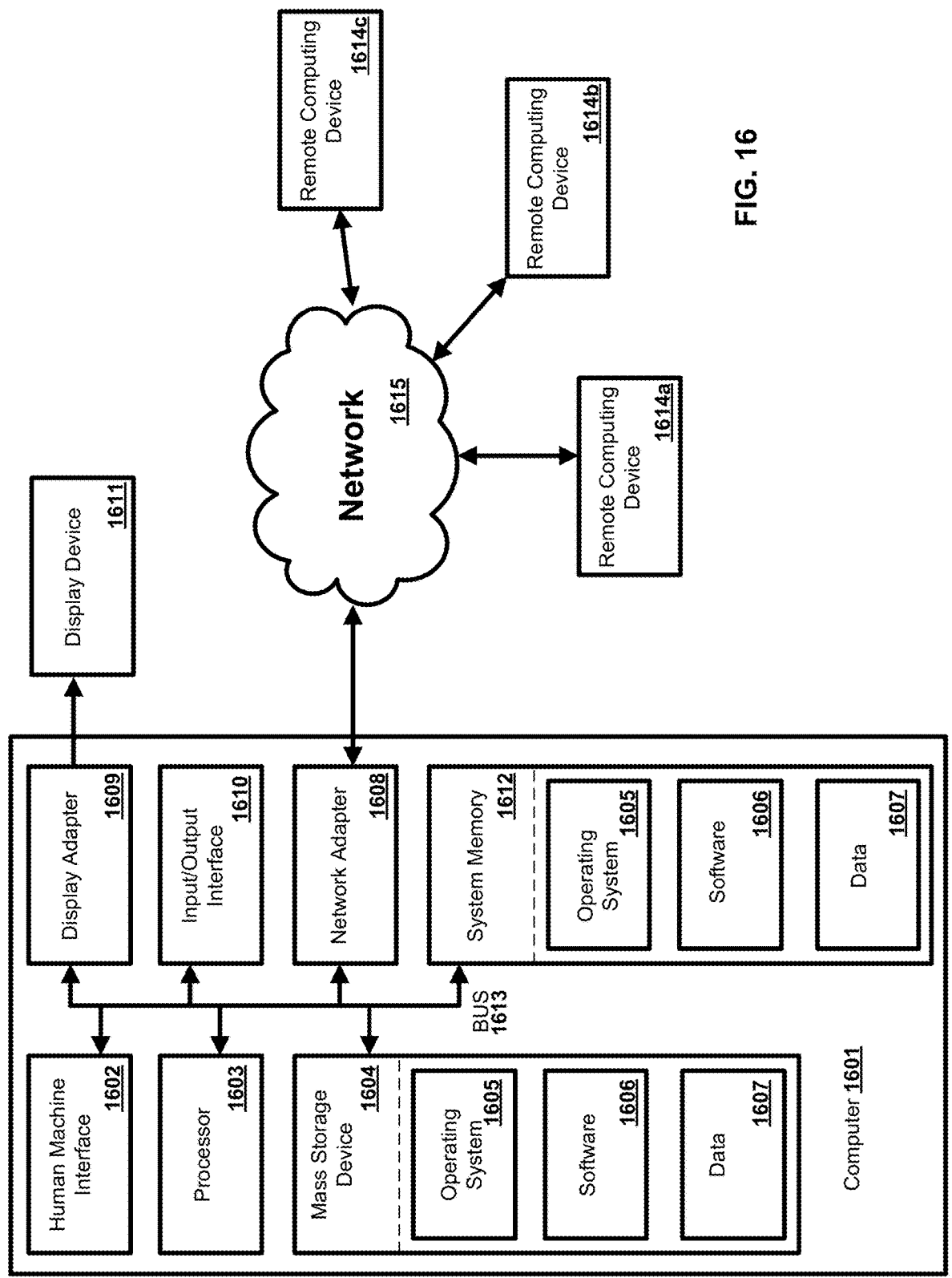
FIG. 16 is an exemplary operating environment for performing the disclosed methods.

In an exemplary aspect, the methods and systems can be implemented on a computer 1601 as illustrated in FIG. 16 and described below. Similarly, the methods and systems disclosed can utilize one or more computers to perform one or more functions in one or more locations. FIG. 16 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1601. The components of the computer 1601 can comprise, but are not limited to, one or more processors 1603, a system memory 1612, and a system bus 1613 that couples various system components including the one or more processors 1603 to the system memory 1612. The system can utilize parallel computing.

The system bus 1613 represents one or more of several possible types of bus structures, including a memory bus or memory controller, a peripheral bus, an accelerated graphics port, or local bus using any of a variety of bus architectures. The bus 1613, and all buses specified in this description can also be implemented over a wired or wireless network connection and each of the subsystems, including the one or more processors 1603, a mass storage device 1604, an operating system 1605, associative data indexing engine software 1606, data 1607, a network adapter 1608, the system memory 1612, an Input/Output Interface 1610, a display adapter 1609, a display device 1611, and a human machine interface 1602, can be contained within one or more remote computing devices 1614a,b,c at physically separate locations, connected through buses of this form, in effect implementing a fully distributed system.

The computer 1601 typically comprises a variety of computer readable media. Exemplary readable media can be any available media that is accessible by the computer 1601 and comprises, for example and not meant to be limiting, both volatile and non-volatile media, removable and non-removable media. The system memory 1612 comprises computer readable media in the form of volatile memory, such as random access memory (RAM), and/or non-volatile memory, such as read only memory (ROM). The system memory 1612 typically contains data such as the data 1607 and/or program modules such as the operating system 1605 and the associative data indexing engine software 1606 that are immediately accessible to and/or are presently operated on by the one or more processors 1603.

In another aspect, the computer 1601 can also comprise other removable/non-removable, volatile/non-volatile computer storage media. By way of example, FIG. 16 illustrates the mass storage device 1604 which can provide non-volatile storage of computer code, computer readable instructions, data structures, program modules, and other data for the computer 1601. For example and not meant to be limiting, the mass storage device 1604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1604, including by way of example, the operating system 1705 and the associative data indexing engine software 1606. Each of the operating system 1605 and the associative data indexing engine software 1606 (or some combination thereof) can comprise elements of the programming and the associative data indexing engine software 1606. The data 1607 can also be stored on the mass storage device 1604. The data 1607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In an aspect, the associative data indexing engine software 1606 can comprise one or more of a script engine, a logical inference engine, a calculation engine, an extension engine, and/or a rendering engine. In an aspect, the associative data indexing engine software 1606 can comprise an external engine and/or an interface to the external engine.

In another aspect, the user can enter commands and information into the computer 1601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1603 via the human machine interface 1602 that is coupled to the system bus 1613, but can be connected by other interface and bus structures, such as a parallel port, game port, an IEEE 1394 Port (also known as a Firewire port), a serial port, or a universal serial bus (USB).

In yet another aspect, the display device 1611 can also be connected to the system bus 1613 via an interface, such as the display adapter 1609. It is contemplated that the computer 1601 can have more than one display adapter 1609 and the computer 1601 can have more than one display device 1611. For example, the display device 1611 can be a monitor, an LCD (Liquid Crystal Display), or a projector. In addition to the display device 1611, other output peripheral devices can comprise components such as speakers (not shown) and a printer (not shown) which can be connected to the computer 1601 via the Input/Output Interface 1610. Any step and/or result of the methods can be output in any form to an output device. Such output can be any form of visual representation, including, but not limited to, textual, graphical, animation, audio, tactile, and the like. The display device 1611 and computer 1601 can be part of one device, or separate devices.

The computer 1601 can operate in a networked environment using logical connections to one or more remote computing devices 1614a,b,c. By way of example, a remote computing device can be a personal computer, portable computer, smartphone, a server, a router, a network computer, a peer device or other common network node, and so on. Logical connections between the computer 1601 and a remote computing device 1614a,b,c can be made via a network 1615, such as a local area network (LAN) and/or a general wide area network (WAN). Such network connections can be through the network adapter 1608. The network adapter 1608 can be implemented in both wired and wireless environments. Such networking environments are conventional and commonplace in dwellings, offices, enterprise-wide computer networks, intranets, and the Internet. In an aspect, one or more of the remote computing devices 1614a,b,c can comprise an external engine and/or an interface to the external engine.

For purposes of illustration, application programs and other executable program components such as the operating system 1605 are illustrated herein as discrete blocks, although it is recognized that such programs and components reside at various times in different storage components of the computing device 1601, and are executed by the one or more processors 1603 of the computer. An implementation of the associative data indexing engine software 1606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method comprising:
   receiving, by a computing device via an analytics user interface, a query to be applied to a dataset, wherein the query comprises at least one keyword;
   determining, based on the query and a machine learning module of a recommendation engine, a plurality of recommended result elements and associated visualization elements, wherein the plurality of recommended result elements comprises a plurality of filters to be applied to the dataset, and wherein the machine learning module is trained based on previous queries that comprise the at least one keyword and are associated with the plurality of filters;
   providing, via the analytics user interface, the plurality of recommended result elements and associated visualization elements;
   receiving, via the analytics user interface, a selection of at least one recommended result element of the plurality of recommended result elements, wherein the at least one recommended result element comprises at least one filter of the plurality of filters;
   determining, based on: the query, the at least one recommended result element, and a selection of at least one recommended visualization element, a query result, wherein the query result is associated with: the query, the at least one recommended result element, and the at least one recommended visualization element, and wherein the query result comprises a portion of the dataset resulting from the at least one filter applied to the dataset; and
   generating, based on the at least one recommended visualization element, a visualization of the query result.

2. The method of claim 1, further comprising:
   determining, based on the previous queries, a frequency of occurrence for each of a plurality of words associated with the previous queries;
   determining, based on the frequency of occurrence for each of the plurality of words, a ranking for each of the plurality of words;
   generating, based on the ranking for each of the plurality of words, a training dataset; and
   training, based on the training dataset, the machine learning module.

3. The method of claim 1, wherein the plurality of recommended result elements and associated visualization elements are provided based on an experience level associated with a user of the analytics user interface.

4. The method of claim 1, wherein the at least one filter is associated with at least one classification variable of the dataset, and wherein the at least one classification variable defines the portion of the dataset based on the at least one filter being applied to the dataset.

5. The method of claim 1, further comprising:
   determining, by the recommendation engine and based on the query, one or more of an analysis intent associated with the query or a context associated with the query, wherein the plurality of recommended result elements is based on one or more of the analysis intent or the context.

6. The method of claim 1, further comprising:
providing, via the analytics user interface, a plurality of visualization elements associated with the at least one recommended result element, wherein the plurality of visualization elements comprises the at least one recommended visualization element; and
receiving, via the analytics user interface, a selection of the at least one recommended visualization element.

7. A method comprising:
(a) receiving, by a computing device via an analytics user interface, a query, comprising at least one keyword, and a result element, wherein the result element is one of a plurality of result elements and comprises at least one filter to be applied to a dataset;
(b) determining, based on the query and the result element, a query result comprising a portion of the dataset resulting from application of the at least one filter on the dataset;
(c) receiving a selection of a visualization element from a plurality of visualization elements to apply to the query result, wherein the plurality of visualization elements are provided at the analytics user interface based on the result element selected at the analytics user interface;
(d) generating a training dataset based on: the at least one keyword of the query, the at least one filter associated with the result element, and the visualization element; and
(e) training a machine learning module of a recommendation engine using the training dataset, wherein the machine learning module is trained to provide the at least one filter as a recommended result element for a further query that comprises the at least one keyword.

8. The method of claim 7, further comprising:
(f) repeating steps (a)-(e) for at least one of: each query of a plurality of queries, each result element of the plurality of result elements, or each visualization element of the plurality of visualization elements.

9. The method of claim 8, wherein each query of the plurality of queries is associated with an experience level of a user of the analytics user interface.

10. The method of claim 9, wherein step (a) further comprises:
determining, by the recommendation engine and based on the query, one or more of an analysis intent associated with the query or a context associated with the query.

11. The method of claim 10, wherein the result element is associated with one or more of the analysis intent or the context.

12. The method of claim 7, wherein the at least one filter is associated with at least one classification variable of the dataset, and wherein the at least one classification variable defines the portion of the dataset based on the at least one filter being applied to the dataset.

13. The method of claim 7, wherein the visualization element is associated with the result element.

14. A non-transitory computer readable medium storing processor executable instructions that, when executed by at least one processor, cause the at least one processor to:
receive, via an analytics user interface, a query to be applied to a dataset, wherein the query comprises at least one keyword;
determine, based on the query and a machine learning module of a recommendation engine, a plurality of recommended result elements and associated visualization elements, wherein the plurality of recommended result elements comprises a plurality of filters to be applied to the dataset, and wherein the machine learning module is trained based on previous queries that comprise the at least one keyword and are associated with the plurality of filters;
provide, via the analytics user interface, the plurality of recommended result elements and associated visualization elements;
receive, via the analytics user interface, a selection of at least one recommended result element of the plurality of recommended result elements, wherein the at least one recommended result element comprises at least one filter of the plurality of filters;
determine, based on: the query, the at least one recommended result element, and a selection of at least one recommended visualization element, a query result, wherein the query result is associated with: the query, the at least one recommended result element, and the at least one recommended visualization element, and wherein the query result comprises a portion of the dataset resulting from the at least one filter applied to the dataset; and
generate, based on the at least one recommended visualization element, a visualization of the query result.

15. The non-transitory computer readable medium of claim 14, wherein the processor executable instructions further cause the at least one processor to:
determine, based on the previous queries, a frequency of occurrence for each of a plurality of words associated with the previous queries;
determine, based on the frequency of occurrence for each of the plurality of words, a ranking for each of the plurality of words;
generate, based on the ranking for each of the plurality of words, a training dataset; and
train, based on the training dataset, the machine learning module.

16. The non-transitory computer readable medium of claim 14, wherein the plurality of recommended result elements and associated visualization elements are provided based on an experience level associated with a user of the analytics user interface.

17. The non-transitory computer readable medium of claim 14, wherein the at least one filter is associated with at least one classification variable of the dataset, and wherein the at least one classification variable defines the portion of the dataset based on the at least one filter being applied to the dataset.

18. The non-transitory computer readable medium of claim 14, wherein the processor executable instructions further cause the at least one processor to:
provide, via the analytics user interface, a plurality of visualization elements associated with the at least one recommended result element, wherein the plurality of visualization elements comprises the at least one recommended visualization element; and
receive, via the analytics user interface, a selection of the at least one recommended visualization element.

* * * * *